(12) United States Patent
Vitullo et al.

(10) Patent No.: US 12,321,164 B2
(45) Date of Patent: Jun. 3, 2025

(54) TIME VARYING PERFORMANCE INDICATION SYSTEM FOR CONNECTED EQUIPMENT

(71) Applicant: Johnson Controls Technology Company, Auburn Hills, MI (US)

(72) Inventors: Steven R. Vitullo, Milwaukee, WI (US); Kelsey C. Schuster, Wauwatosa, WI (US); Michael R. Rhodes, Shorewood, WI (US); Riley P. Shelton, Oak Creek, WI (US); John F. Kuchler, Muskego, WI (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 98 days.

(21) Appl. No.: 18/105,721

(22) Filed: Feb. 3, 2023

(65) Prior Publication Data
US 2023/0185297 A1    Jun. 15, 2023

Related U.S. Application Data

(63) Continuation of application No. 17/400,950, filed on Aug. 12, 2021, now Pat. No. 11,630,453, which is a
(Continued)

(51) Int. Cl.
G05B 23/02    (2006.01)
G05B 17/02    (2006.01)

(52) U.S. Cl.
CPC ......... G05B 23/0283 (2013.01); G05B 17/02 (2013.01); G05B 23/0221 (2013.01);
(Continued)

(58) Field of Classification Search
CPC ............... G05B 23/0283; G05B 17/02; G05B 23/0221; G05B 23/0235; G05B 23/0264;
(Continued)

(56) References Cited

U.S. PATENT DOCUMENTS

| 5,083,438 A | 1/1992 | McMullin |
|---|---|---|
| 10,257,052 B1 | 4/2019 | Lønborg et al. |

(Continued)

OTHER PUBLICATIONS

Sharaf et al. (Overall performance index for hybrid power plants, 2015) (Year: 2015).*
(Continued)

*Primary Examiner* — Mohammad K Islam
(74) *Attorney, Agent, or Firm* — Foley & Lardner LLP

(57) ABSTRACT

A system includes equipment operable to affect, monitor, or control one or more variable states or conditions in a building. The system further includes circuitry configured to perform a plurality of performance checks for the equipment, determine a plurality of individual performance check indicators based on the plurality of performance checks using a plurality of first weights determined based on different timings, generate an overall performance index for the equipment using the plurality of individual performance check indicators and a plurality of second weights, and initiate or execute a preventative maintenance action for the equipment based on the overall performance index.

20 Claims, 16 Drawing Sheets

Related U.S. Application Data continuation of application No. 16/245,122, filed on Jan. 10, 2019, now Pat. No. 11,092,954.

(52) U.S. Cl.
CPC ..... *G05B 23/0235* (2013.01); *G05B 23/0264* (2013.01); *G05B 2219/2642* (2013.01)

(58) Field of Classification Search
CPC ........ G05B 2219/2642; G05B 23/0251; G05B 23/0294; G05B 2219/2614
See application file for complete search history.

(56) References Cited

U.S. PATENT DOCUMENTS

| | | | |
|---|---|---|---|
| 10,378,794 | B2 | 8/2019 | Togano et al. |
| 11,092,954 | B2 | 8/2021 | Vitullo et al. |
| 11,493,913 | B2 * | 11/2022 | Shukla ................ G06F 11/3013 |
| 2006/0144057 | A1 | 7/2006 | You et al. |
| 2009/0210081 | A1 | 8/2009 | Sustaeta et al. |
| 2012/0259583 | A1 | 10/2012 | Noboa et al. |
| 2013/0098084 | A1 | 4/2013 | Matsuo et al. |
| 2015/0167999 | A1 | 6/2015 | Seem et al. |
| 2015/0178865 | A1 | 6/2015 | Anderson et al. |
| 2015/0316907 | A1 | 11/2015 | Elbsat et al. |
| 2016/0057029 | A1 | 2/2016 | Iida et al. |
| 2016/0061693 | A1 | 3/2016 | Salsbury et al. |
| 2016/0334122 | A1 | 11/2016 | Shiel |
| 2017/0276571 | A1 | 9/2017 | Vitullo et al. |
| 2017/0293293 | A1 | 10/2017 | Brownie et al. |
| 2017/0309094 | A1 | 10/2017 | Farahat et al. |
| 2017/0366414 | A1 | 12/2017 | Hamilton et al. |
| 2018/0039292 | A1 | 2/2018 | Van Berkel et al. |
| 2018/0046151 | A1 | 2/2018 | Ahmed |
| 2018/0087790 | A1 | 3/2018 | Perez |
| 2018/0373234 | A1 | 12/2018 | Khalate et al. |
| 2019/0086108 | A1 | 3/2019 | Okita et al. |
| 2019/0245223 | A1 | 8/2019 | Kügele et al. |
| 2019/0293313 | A1 | 9/2019 | Reeve et al. |
| 2019/0293318 | A1 | 9/2019 | Reeve et al. |
| 2019/0338972 | A1 | 11/2019 | Schuster et al. |
| 2020/0019129 | A1 | 1/2020 | Sircar et al. |

OTHER PUBLICATIONS

Johnson Controls York, "Model YK (Style H) R-134a with Optiview™ Control Center for Electro-Mechanical Starter, Solid State Starter and Variable Speed Drive," Jun. 15, 2015, 38 pages.

\* cited by examiner

TIME VARYING PERFORMANCE INDICATION SYSTEM FOR CONNECTED EQUIPMENT

CROSS-REFERENCE TO RELATED PATENT APPLICATIONS

This application is a continuation of U.S. patent application Ser. No. 17/400,950 filed Aug. 12, 2021, which is a continuation of U.S. patent application Ser. No. 16/245,122, filed Jan. 10, 2019, which granted as U.S. Pat. No. 11,092,954 on Aug. 17, 2021, all of which are incorporated by reference herein in their entireties.

BACKGROUND

The present disclosure relates generally to building management systems. The present disclosure relates more particularly to fault detection and generating an overall performance index for connected equipment in a building management system. A building management system (BMS) is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

Systems and devices in a BMS often generate temporal or time-series data that can be analyzed to determine the performance of the BMS and the various components thereof. The data generated by the BMS can include measured or calculated values that exhibit statistical characteristics and provide information about how the corresponding system or process (e.g., a temperature control process, a flow control process, etc.) is performing in terms of error from its setpoint. These data can be examined and alert a user to repair the fault before it becomes more severe when the monitored system or process begins to degrade in performance.

SUMMARY

One implementation of the present disclosure is a system for generating a performance index for connected equipment. The system includes the connected equipment and a time varying performance indication system. The connected equipment can be configured to measure a plurality of monitored variables and generate a plurality of status codes. The time varying performance indication system can be configured to obtain data points of the plurality of monitored variables and the plurality of status codes from past N time units, and N is a number. The time varying performance indication system can be configured to obtain a plurality of connected equipment specific parameters that are parameters specific to the connected equipment. The time varying performance indication system can be configured to perform a plurality of first performance checks for the connected equipment using the plurality of status codes from the past N time units. The time varying performance indication system can be configured to perform a plurality of second performance checks for the connected equipment using the data points of the plurality of monitored variables from the past N time units, the plurality of connected equipment specific parameters, and a plurality of predetermined rules. The time varying performance indication system can be configured to determine a plurality of individual performance check indicators based on the first performance checks and the second performance checks using a plurality of first weights each determined based on a different timing. The time varying performance indication system can be configured to generate an overall performance index for the connected equipment using the plurality of individual performance check indicators and a plurality of second weights.

In some embodiments, the connected equipment is a chiller.

In some embodiments, the plurality of second performance checks are performed by applying the data points of the plurality of monitored variables from the past N time units and the plurality of connected equipment specific parameters to the plurality of predetermined rules.

In some embodiments, each of the plurality of second weights is determined based on a predetermined degree of severity of a respective first performance check or a respective second performance check.

In some embodiments, the time varying performance indication system can be configured to determine that a total runtime of the connected equipment in a past time window, and generate the overall performance index only when the total runtime of the connected equipment in the past time window satisfies a predetermine threshold.

In some embodiments, the time varying performance indication system can be configured to cause an adjustment to the connected equipment based on the overall performance index generated for the connected equipment.

In some embodiments, the time units are days, hours, minutes, seconds, weeks, months, or years.

In some embodiments, the first performance checks are status checks and the second performance checks are health checks.

Another implementation of the present disclosure is a method for generating a performance index for connected equipment. The method includes obtaining, by a time varying performance indication system comprising a processing circuit and memory, data points of a plurality of monitored variables and a plurality of status codes from past N time units. N is a number. The plurality of monitored variables are measured by connected equipment, and the plurality of status codes are generated by the connected equipment. The method includes obtaining, by the time varying performance indication system, a plurality of connected equipment specific parameters that are parameters specific to the connected equipment. The method includes performing, by the time varying performance indication system, a plurality of first performance checks for the connected equipment using the plurality of status codes from the past N time units. The method includes performing, by the time varying performance indication system, a plurality of second performance checks for the connected equipment using the data points of the plurality of monitored variables from the past N time units, the plurality of connected equipment specific parameters, and a plurality of predetermined rules. The method includes determining, by the time varying performance indication system, a plurality of individual performance check indicators based on the first performance checks and the second performance checks using a plurality of first weights each determined based on a different timing. The method includes generating, by the time varying performance indication system, an overall performance index for the connected equipment using the plurality of individual performance check indicators and a plurality of second weights.

In some embodiments, the method includes determining that a total runtime of the connect equipment in a past time window, and generating the overall performance index only when the total runtime of the connect equipment in the past time window satisfies a predetermine threshold.

In some embodiments, the method includes causing an adjustment to the connect equipment based on the overall performance index generated for the connected equipment.

Another implementation of the present disclosure is a non-transitory computer-readable medium. The non-transitory computer-readable medium stores computer-executable instructions that when executed by at least one processor, causing the at least one processor to perform operations for generating a performance index for connected equipment. The operations include obtaining data points of a plurality of monitored variables and a plurality of status codes from past N time units. N is a number. The plurality of monitored variables are measured by connected equipment, and the plurality of status codes are generated by the connected equipment. The operations include obtaining a plurality of connected equipment specific parameters that are parameters specific to the connected equipment. The operations include performing a plurality of first performance checks for the connected equipment using the plurality of status codes from the past N time units. The operations include performing a plurality of second performance checks for the connected equipment using the data points of the plurality of monitored variables from the past N time units, the plurality of connected equipment specific parameters, and a plurality of predetermined rules. The operations include determining a plurality of individual performance check indicators based on the first performance checks and the second performance checks using a plurality of first weights each determined based on a different timing. The operations include generating an overall performance index for the connected equipment using the plurality of individual performance check indicators and a plurality of second weights.

In some embodiments, the operations include determining that a total runtime of the connect equipment in a past time window, and generating the overall performance index only when the total runtime of the connect equipment in the past time window satisfies a predetermine threshold.

In some embodiments, the operations include causing an adjustment to the connect equipment based on the overall performance index generated for the connected equipment.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Following below are more detailed descriptions of various concepts related to, and implementations of systems, methods, and apparatuses for generating time varying performance indications for connected equipment in a building management system. Before turning to the more detailed descriptions and figures, which illustrate the exemplary embodiments in detail, it should be understood that the application is not limited to the details or methodology set forth in the descriptions or illustrated in the figures. It should also be understood that the terminology is for the purpose of description only and should not be regarded as limiting in any way.

Building HVAC Systems and Building Management Systems

Figure 1:
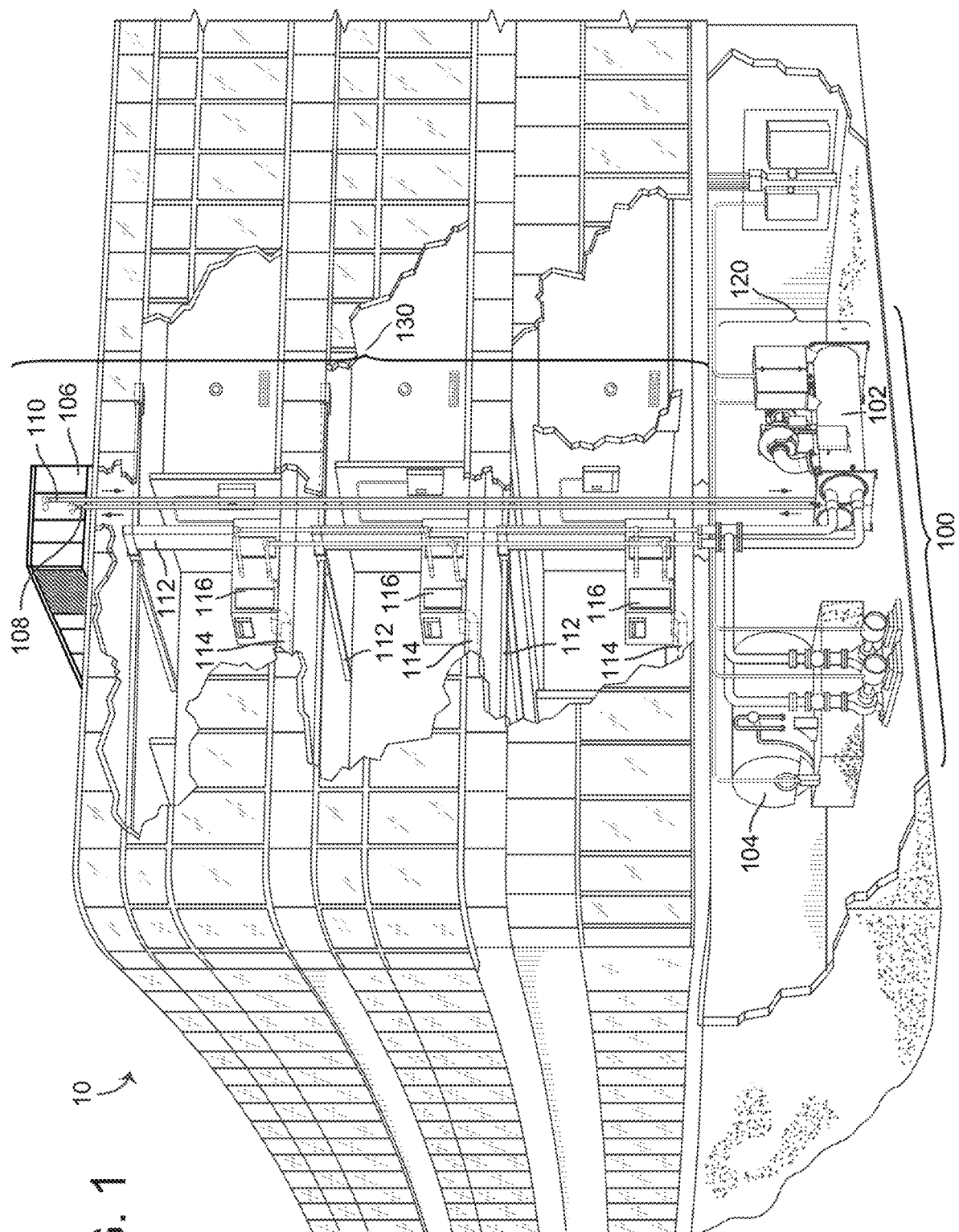
FIG. 1 is a drawing of a building equipped with a HVAC system, according to some embodiments.
Figure 2:
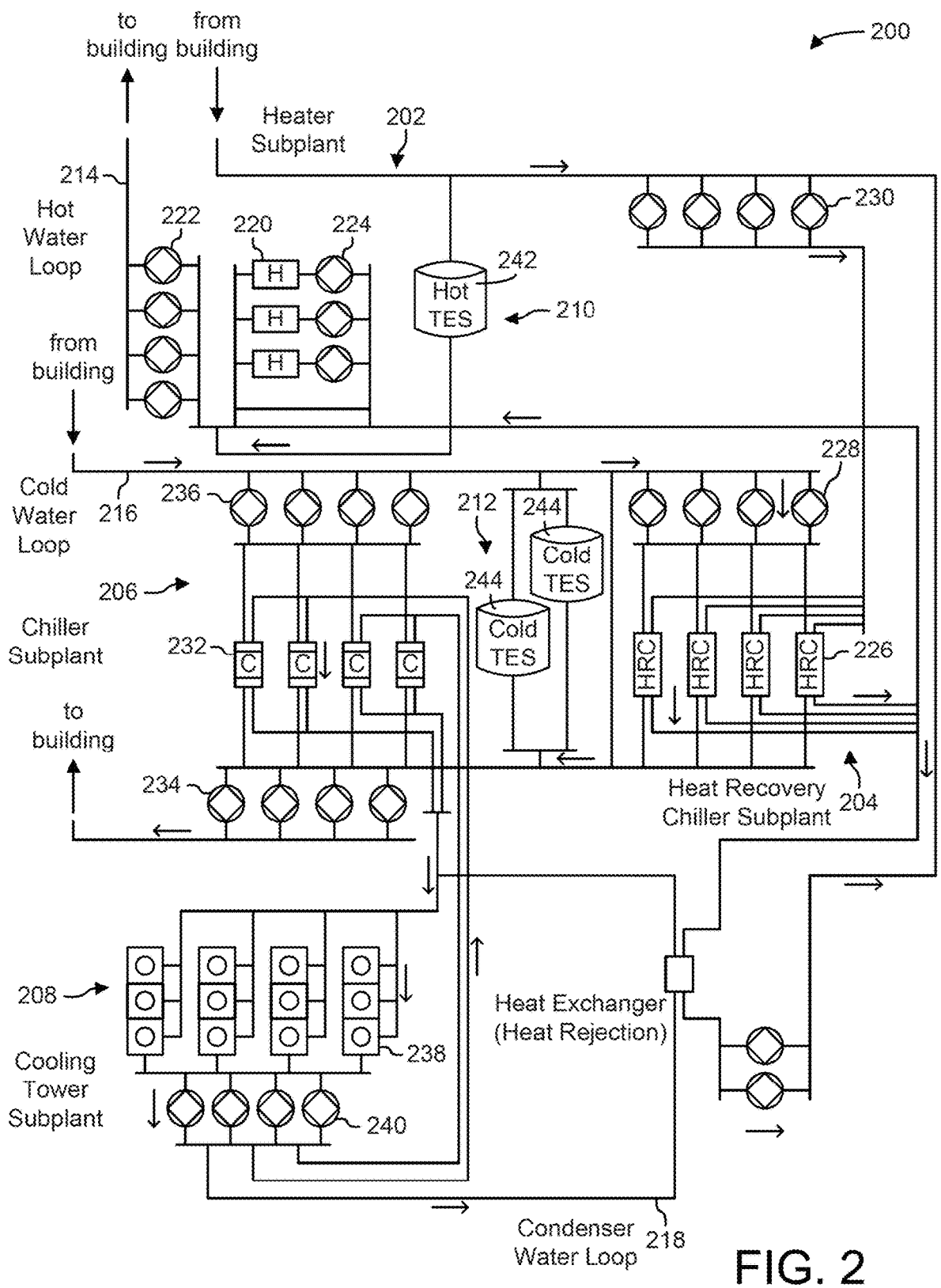
FIG. 2 is a schematic diagram of a waterside system which can be used in conjunction with the building of FIG. 1, according to some embodiments.
Figure 3:
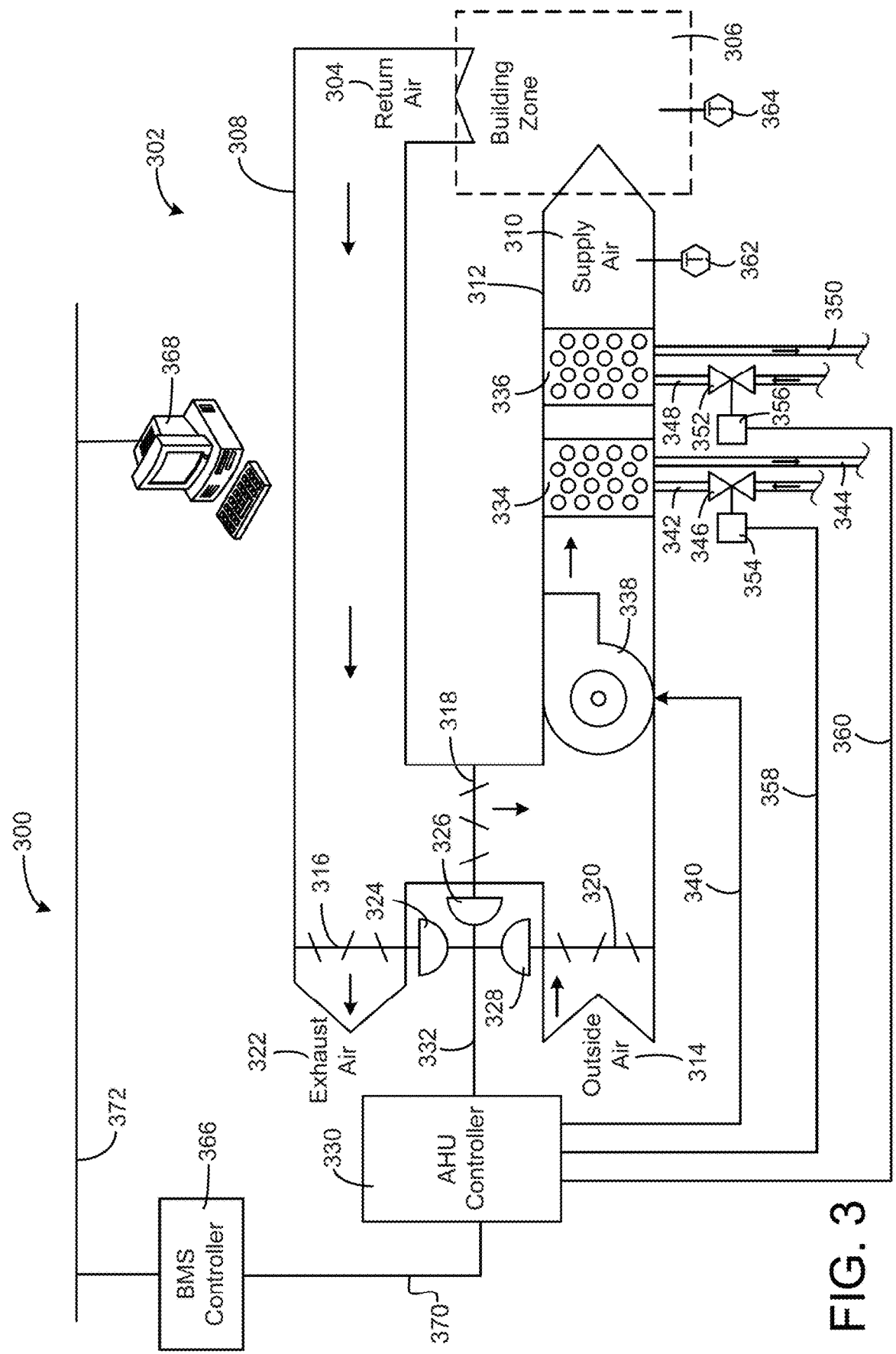
FIG. 3 is a schematic diagram of an airside system which can be used in conjunction with the building of FIG. 1, according to some embodiments.
Figure 4:
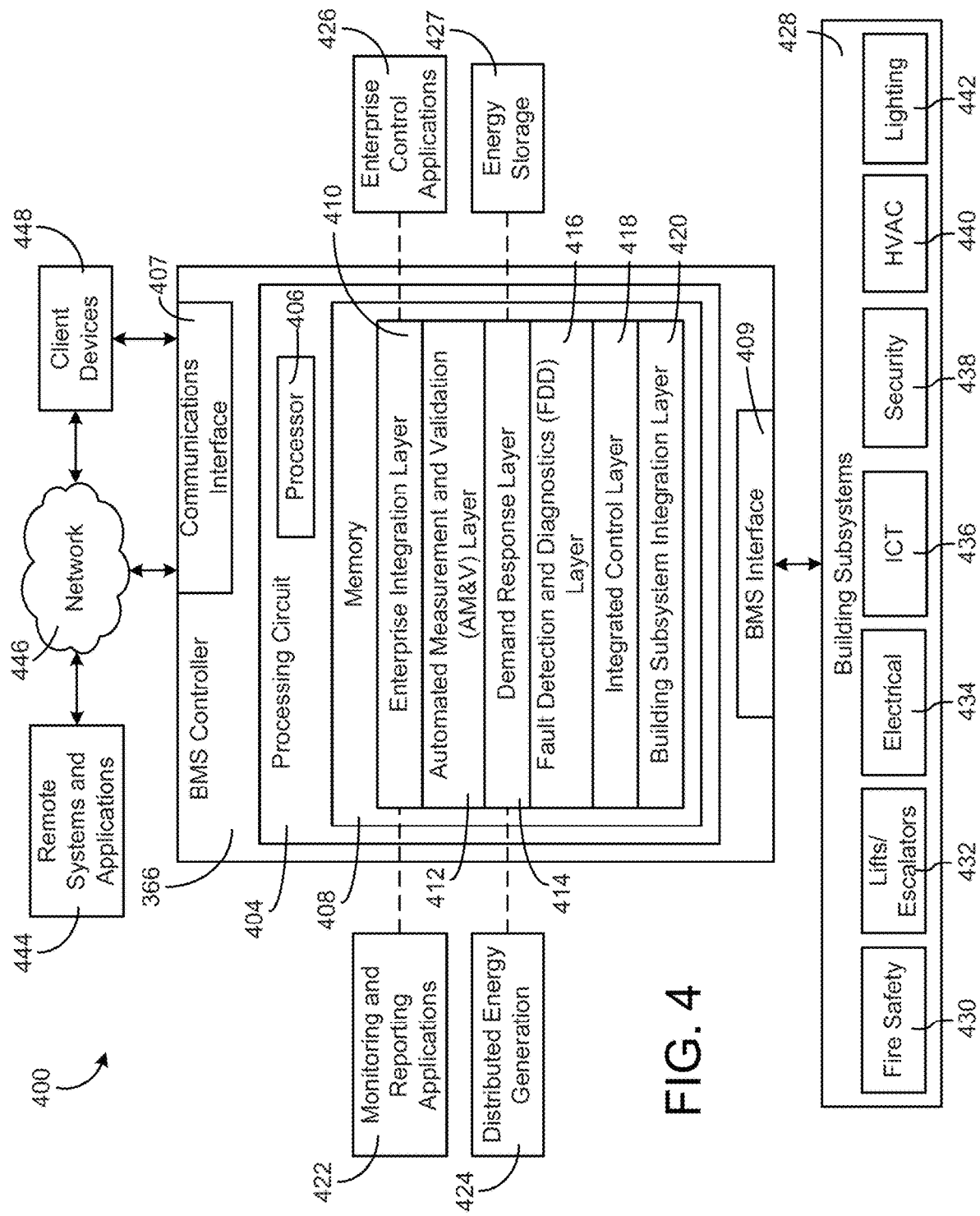
FIG. 4 is a block diagram of a building management system (BMS) which can be used to monitor and control the building of FIG. 1, according to some embodiments.
Figure 5:
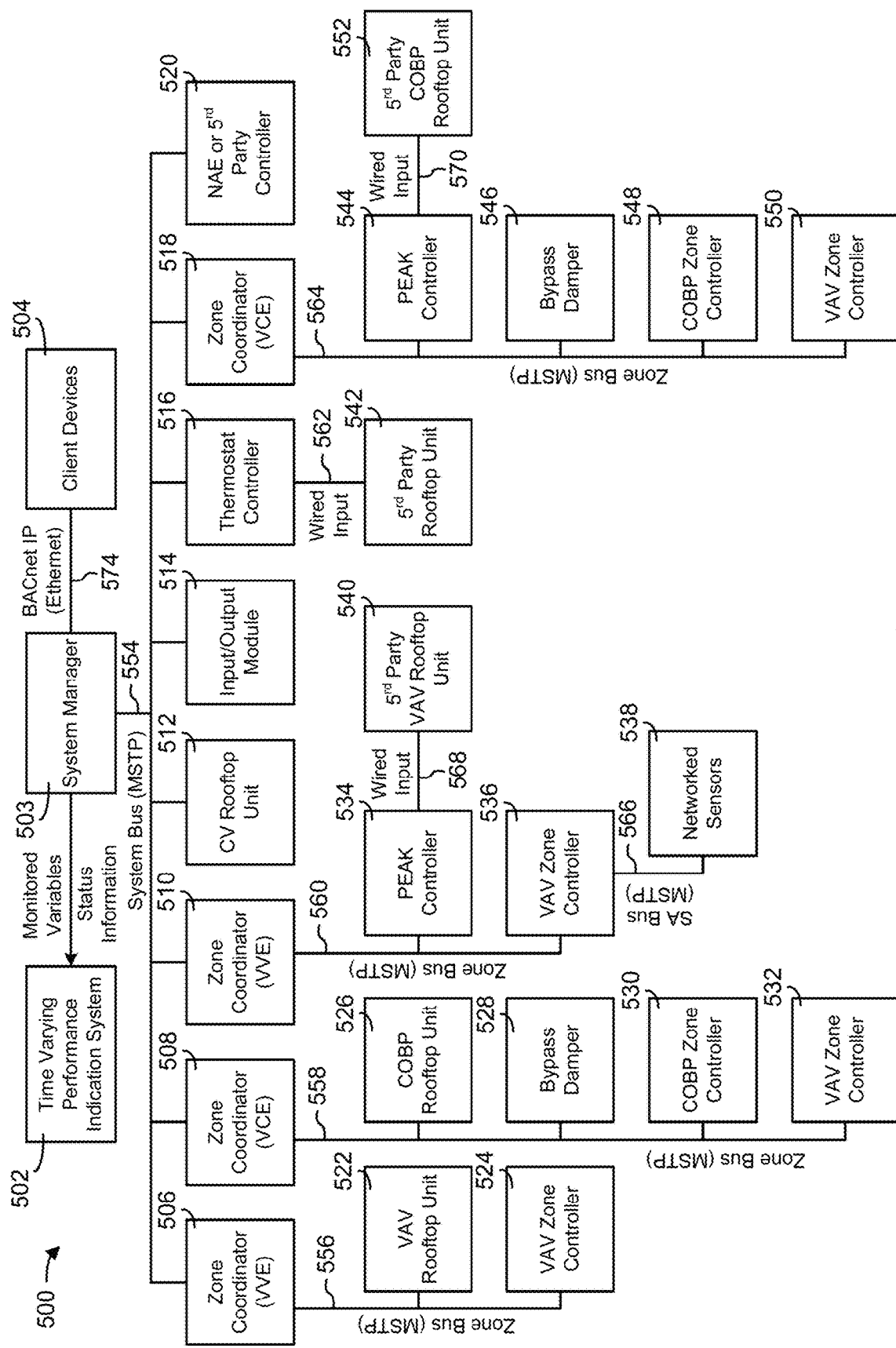
FIG. 5 is a block diagram of another BMS which can be used to monitor and control the building of FIG. 1 and includes a time varying performance indication system, according to some embodiments.

Referring now to FIGS. 1-5, several building management systems (BMS) and HVAC systems in which the systems and methods of the present disclosure can be implemented are shown, according to some embodiments. In brief overview, FIG. 1 shows a building 10 equipped with a HVAC system 100. FIG. 2 is a block diagram of a waterside system 200 which can be used to serve building 10. FIG. 3 is a block diagram of an airside system 300 which can be used to serve building 10. FIG. 4 is a block diagram of a BMS which can be used to monitor and control building 10. FIG. 5 is a block diagram of another BMS which can be used to monitor and control building 10.

Building 10 and HVAC System 100

Referring particularly to FIG. 1, a perspective view of building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2 and 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Waterside System 200

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve thermal energy loads. In other embodiments, subplants 202-212 may provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Airside System 300

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Building Management System 400

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, thermostats, and other devices for controlling the temperature, humidity, airflow, or other variable conditions within building 10. Lighting subsystem 442 can include any number of light fixtures, ballasts, lighting sensors, dimmers, and/or other devices configured to controllably adjust the amount of light provided to a building space. Security subsystem 438 can include occupancy sensors, video surveillance cameras, digital video recorders, video processing servers, intrusion detection devices, access control devices and servers, and/or other security-related devices.

Still referring to FIG. 4, BMS controller 366 is shown to include a communications interface 407 and a BMS interface 409. Communications interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Communications interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Communications interfaces 407 and/or BMS interface 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interfaces 407 and/or BMS interface 409 can be direct (e.g., local wired or wireless communications) or via a communications network 446 (e.g., a WAN, the Internet, a cellular network, etc.). For example, communications interfaces 407 and/or BMS interface 409 can include an Ethernet card and port for sending and receiving data via an Ethernet-based communications link or network. In another example, communications interfaces 407 and/or BMS interface 409 can include a Wi-Fi transceiver for communicating via a wireless communications network. In another example, one or both of communications interfaces 407 and BMS interface 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via communications interfaces 407 and/or BMS interface 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at communications interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers can include environmental or sensor inputs (e.g., internal to building 10, external to building 10, etc.) such as temperature, carbon dioxide levels, relative humidity levels, air quality sensor outputs, occupancy sensor outputs, room schedules, weather conditions, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints, etc.) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML files, etc.). The policy definitions can be edited or adjusted by a user (e.g., via a graphical user interface, etc.) so that the control actions initiated in response to demand inputs can be tailored for the user's application, desired comfort level, particular building equipment, and/or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and/or when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, and/or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage, etc.) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Building Management System 500

Referring now to FIG. 5, a block diagram of another building management system (BMS) 500 is shown, according to some embodiments. BMS 500 can be used to monitor and control the devices of HVAC system 100, waterside system 200, airside system 300, building subsystems 428, as well as other types of BMS devices (e.g., lighting equipment, security equipment, etc.) and/or HVAC equipment. In some embodiments, the building management system includes a time varying performance indication system.

BMS 500 provides a system architecture that facilitates automatic equipment discovery and equipment model distribution. Equipment discovery can occur on multiple levels of BMS 500 across multiple different communications busses (e.g., a system bus 554, zone buses 556-560 and 564, sensor/actuator bus 566, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 500 can begin interacting with the new device (e.g., sending control signals, using data from the device) without user interaction.

Some devices in BMS 500 present themselves to the network using equipment models. An equipment model defines equipment object attributes, view definitions, schedules, trends, and the associated BACnet value objects (e.g., analog value, binary value, multistate value, etc.) that are used for integration with other systems. Some devices in BMS 500 store their own equipment models. Other devices in BMS 500 have equipment models stored externally (e.g., within other devices). For example, a zone coordinator 508 can store the equipment model for a bypass damper 528. In some embodiments, zone coordinator 508 automatically creates the equipment model for bypass damper 528 or other devices on zone bus 558. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 5, BMS 500 is shown to include a time varying performance indication system 502, a system manager 503; several zone coordinators 506, 508, 510 and 518; and several zone controllers 524, 530, 532, 536, 548, and 550. System manager 503 can monitor various data points in BMS 500 and report monitored variables to time varying performance indication system 502. System manager 503 can communicate with client devices 504 (e.g., user devices, desktop computers, laptop computers, mobile devices, etc.) via a data communications link 574 (e.g., BACnet IP, Ethernet, wired or wireless communications, etc.). System manager 503 can provide a user interface to client devices 504 via data communications link 574. The user interface may allow users to monitor and/or control BMS 500 via client devices 504.

In some embodiments, system manager 503 is connected with zone coordinators 506-510 and 518 via a system bus 554. System manager 503 can be configured to communicate with zone coordinators 506-510 and 518 via system bus 554 using a master-slave token passing (MSTP) protocol or any other communications protocol. System bus 554 can also connect system manager 503 with other devices such as a constant volume (CV) rooftop unit (RTU) 512, an input/output module (IOM) 514, a thermostat controller 516 (e.g., a TEC5000 series thermostat controller), and a network automation engine (NAE) or third-party controller 520. RTU 512 can be configured to communicate directly with system manager 503 and can be connected directly to system bus 554. Other RTUs can communicate with system manager 503 via an intermediate device. For example, a wired input 562 can connect a third-party RTU 542 to thermostat controller 516, which connects to system bus 554.

System manager 503 can provide a user interface for any device containing an equipment model. Devices such as zone coordinators 506-510 and 518 and thermostat controller 516 can provide their equipment models to system manager 503 via system bus 554. In some embodiments, system manager 503 automatically creates equipment models for connected devices that do not contain an equipment model (e.g., IOM 514, third party controller 520, etc.). For example, system manager 503 can create an equipment model for any device that responds to a device tree request. The equipment models created by system manager 503 can be stored within system manager 503. System manager 503 can then provide a user interface for devices that do not contain their own equipment models using the equipment models created by system manager 503. In some embodiments, system manager 503 stores a view definition for each type of equipment connected via system bus 554 and uses the stored view definition to generate a user interface for the equipment.

Each zone coordinator 506-510 and 518 can be connected with one or more of zone controllers 524, 530-532, 536, and 548-550 via zone buses 556, 558, 560, and 564. Zone coordinators 506-510 and 518 can communicate with zone controllers 524, 530-532, 536, and 548-550 via zone busses 556-560 and 564 using a MSTP protocol or any other communications protocol. Zone busses 556-560 and 564 can also connect zone coordinators 506-510 and 518 with other types of devices such as variable air volume (VAV) RTUs 522 and 540, changeover bypass (COBP) RTUs 526 and 552, bypass dampers 528 and 546, and PEAK controllers 534 and 544.

Zone coordinators 506-510 and 518 can be configured to monitor and command various zoning systems. In some embodiments, each zone coordinator 506-510 and 518 monitors and commands a separate zoning system and is connected to the zoning system via a separate zone bus. For example, zone coordinator 506 can be connected to VAV RTU 522 and zone controller 524 via zone bus 556. Zone coordinator 508 can be connected to COBP RTU 526, bypass damper 528, COBP zone controller 530, and VAV zone controller 532 via zone bus 558. Zone coordinator 510 can be connected to PEAK controller 534 and VAV zone controller 536 via zone bus 560. Zone coordinator 518 can be connected to PEAK controller 544, bypass damper 546, COBP zone controller 548, and VAV zone controller 550 via zone bus 564.

A single model of zone coordinator 506-510 and 518 can be configured to handle multiple different types of zoning systems (e.g., a VAV zoning system, a COBP zoning system, etc.). Each zoning system can include a RTU, one or more zone controllers, and/or a bypass damper. For example, zone coordinators 506 and 510 are shown as Verasys VAV engines (VVEs) connected to VAV RTUs 522 and 540, respectively. Zone coordinator 506 is connected directly to VAV RTU 522 via zone bus 556, whereas zone coordinator 510 is connected to a third-party VAV RTU 540 via a wired input 568 provided to PEAK controller 534. Zone coordinators 508 and 518 are shown as Verasys COBP engines (VCEs) connected to COBP RTUs 526 and 552, respectively. Zone coordinator 508 is connected directly to COBP RTU 526 via zone bus 558, whereas zone coordinator 518 is connected to a third-party COBP RTU 552 via a wired input 570 provided to PEAK controller 544.

Zone controllers 524, 530-532, 536, and 548-550 can communicate with individual BMS devices (e.g., sensors, actuators, etc.) via sensor/actuator (SA) busses. For example, VAV zone controller 536 is shown connected to networked sensors 538 via SA bus 566. Zone controller 536 can communicate with networked sensors 538 using a MSTP protocol or any other communications protocol. Although only one SA bus 566 is shown in FIG. 5, it should be understood that each zone controller 524, 530-532, 536, and 548-550 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 524, 530-532, 536, and 548-550 can be configured to monitor and control a different building zone. Zone controllers 524, 530-532, 536, and 548-550 can use the inputs and outputs provided via their SA busses to monitor and control various building zones. For example, a zone controller 536 can use a temperature input received from networked sensors 538 via SA bus 566 (e.g., a measured temperature of a building zone) as feedback in a temperature control algorithm. Zone controllers 524, 530-532, 536, and 548-550 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 6:
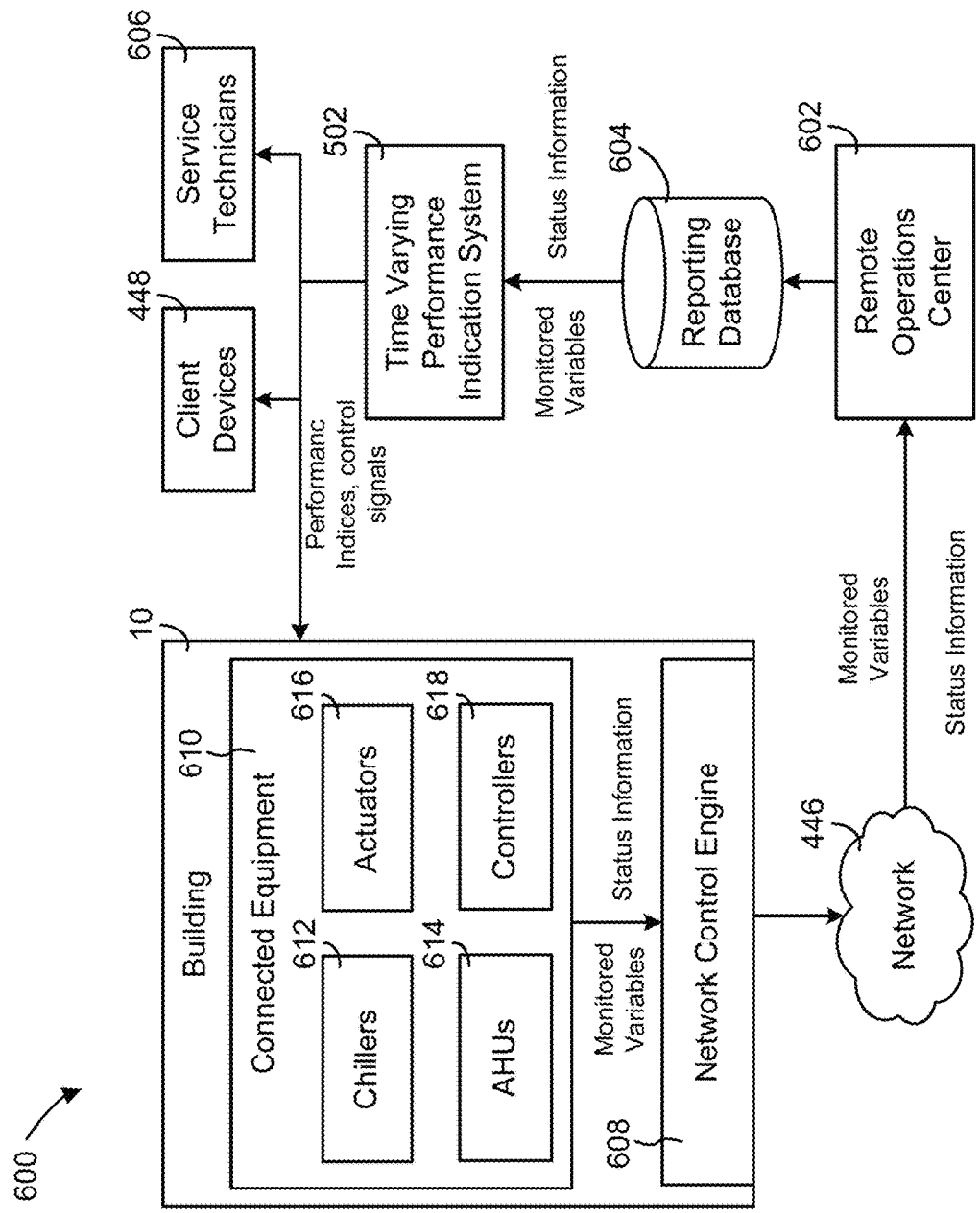
FIG. 6 is a block diagram of another BMS including the time varying performance indication system for generating a performance index for connected equipment, according to some embodiments.

Time Varying Performance Indication System of Generating Performance Index for Connected Equipment Referring now to FIG. 6, a block diagram of another building management system (BMS) 600 which includes the time varying performance indication system for generating a performance index for connected equipment is shown, according to some embodiments. BMS 600 can include many of the same components as BMS 400 and BMS 500 as described with reference to FIGS. 4 and 5. For example, BMS 600 is shown to include building 10, network 446, client devices 448, and time varying performance indication system 502. Building 10 is shown to include connected equipment 610, which can include any type of equipment used to monitor and/or control building 10. Connected equipment 610 can include connected chillers 612, connected AHUs 614, connected actuators 616, connected controllers 618, or any other type of equipment in a building HVAC system (e.g., boilers, economizers, valves, dampers, cooling towers, fans, pumps, etc.) or building management system (e.g., lighting equipment, security equipment, refrigeration equipment, etc.). Connected equipment 610 can include any of the equipment of HVAC system 100, waterside system 200, airside system 300, BMS 400, and/or BMS 500, as described with reference to FIGS. 1-5.

Connected equipment 610 can be outfitted with sensors to monitor particular conditions of the connected equipment 610. For example, chillers 612 can include sensors configured to monitor chiller variables such as chilled water return temperature, chilled water supply temperature, chilled water flow status (e.g., mass flow rate, volume flow rate, etc.), condensing water return temperature, condensing water supply temperature, motor amperage (e.g., of a compressor, etc.), variable speed drive (VSD) output frequency, and refrigerant properties (e.g., refrigerant pressure, refrigerant temperature, condenser pressure, evaporator pressure, etc.) at various locations in the refrigeration circuit. An example of a chiller 700 which can be used as one of chillers 612 is described in greater detail with reference to FIG. 7. Similarly, AHUs 614 can be outfitted with sensors to monitor AHU variables such as supply air temperature and humidity, outside air temperature and humidity, return air temperature and humidity, chilled fluid temperature, heated fluid temperature, damper position, etc. In general, connected equipment 610 monitor and report variables that characterize the performance of the connected equipment 610. Each monitored variable can be forwarded to network control engine 608 as a data point (e.g., including a point ID, a point value, etc.).

Monitored variables can include any measured or calculated values indicating the performance of connected equipment 610 and/or the components thereof. For example, monitored variables can include one or more measured or calculated temperatures (e.g., refrigerant temperatures, cold water supply temperatures, hot water supply temperatures, supply air temperatures, zone temperatures, etc.), pressures (e.g., evaporator pressure, condenser pressure, supply air pressure, etc.), flow rates (e.g., cold water flow rates, hot water flow rates, refrigerant flow rates, supply air flow rates, etc.), valve positions, resource consumptions (e.g., power consumption, water consumption, electricity consumption, etc.), control setpoints, model parameters (e.g., regression model coefficients, etc.), and/or any other time-series values that provide information about how the corresponding system, device, and/or process is performing. Monitored variables can be received from connected equipment 610 and/or from various components thereof. For example, monitored variables can be received from one or more controllers (e.g., BMS controllers, subsystem controllers, HVAC controllers, subplant controllers, AHU controllers, device controllers, etc.), BMS devices (e.g., chillers, cooling towers, pumps, heating elements, etc.), and/or collections of BMS devices.

Connected equipment 610 can also report equipment status information. Equipment status information can include, for example, the operational status of the equipment, an operating mode (e.g., low load, medium load, high load, etc.), an indication of whether the equipment is running under normal or abnormal conditions, a safety fault code, and/or any other information that indicates the current status of connected equipment 610. In some embodiments, equipment status information reported by the connected equipment 610 is in the form of status codes. For example, four types of status codes can be reported by a connected equipment (e.g., chiller), including safety shutdown codes (safety codes), warning codes, cycling codes, and operation codes. The status codes are described in greater detail herein below in this disclosure.

Figure 7:
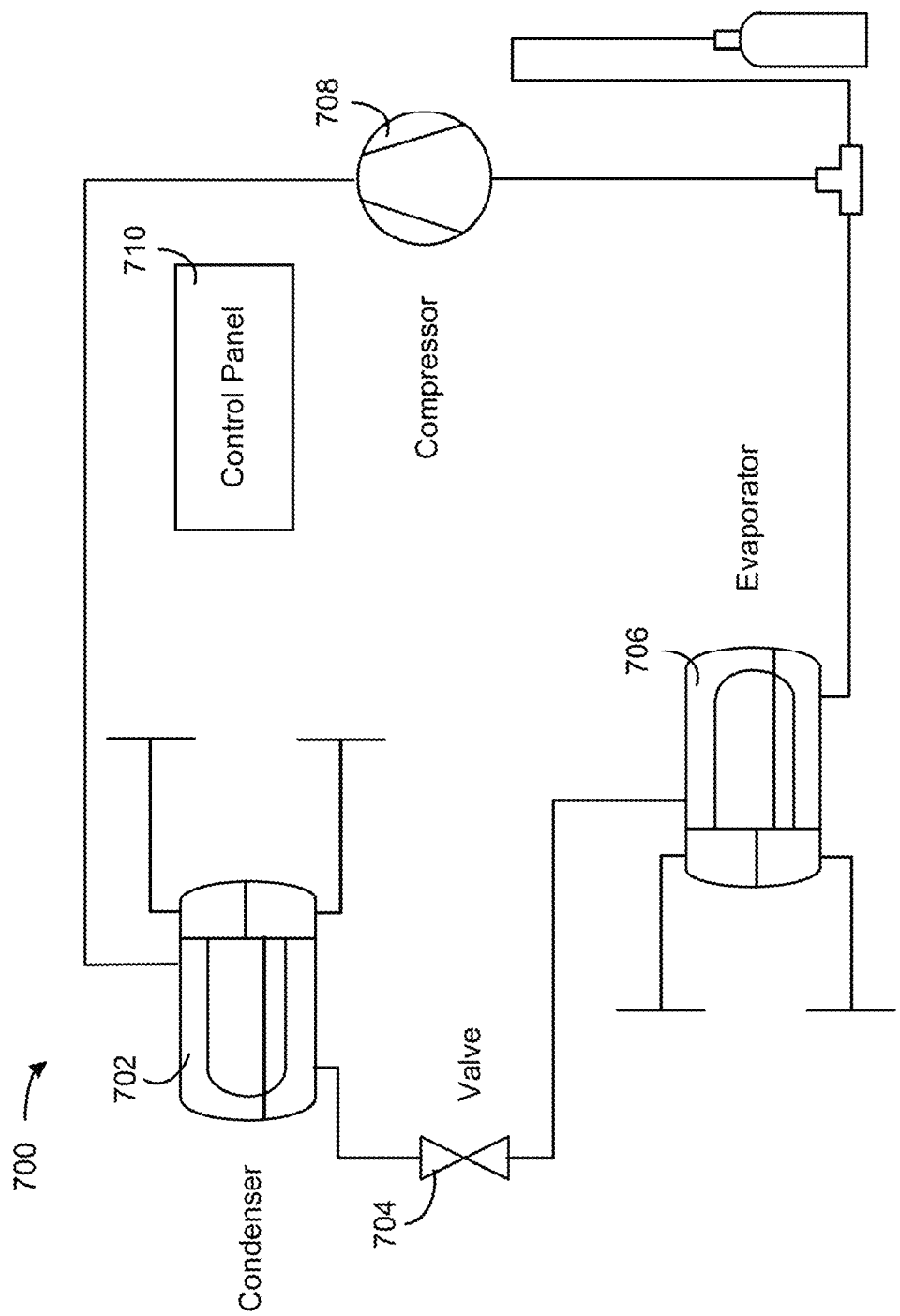
FIG. 7 is a schematic diagram of a chiller, which is an example of a type of connected equipment which can report monitored variables and status information to the time varying performance indication system, according to some embodiments.

In some embodiments, each device of connected equipment 610 includes a control panel (e.g., control panel 710 shown in FIG. 7). The control panel can use the sensor data to shut down the device if the control panel determines that the device is operating under unsafe conditions. For example, the control panel can compare the sensor data (or a value derived from the sensor data) to predetermined thresholds. If the sensor data or calculated value crosses a safety threshold, the control panel can shut down the device and/or operate the device at a derated setpoint. The control panel can generate a data point when a safety shut down or a derate occurs. The data point can include a safety fault code which indicates the reason or condition that triggered the shut down or derate.

Connected equipment 610 can provide monitored variables and equipment status information to a network control engine 608. Network control engine 608 can include a building controller (e.g., BMS controller 366), a system manager (e.g., system manager 503), a network automation engine (e.g., NAE 520), or any other system or device of building 10 configured to communicate with connected equipment 610. In some embodiments, the monitored variables and the equipment status information are provided to network control engine 608 as data points. Each data point can include a point ID and/or a point value. The point ID can identify the type of data point and/or a variable measured by the data point (e.g., condenser pressure, refrigerant temperature, fault code, etc.). Monitored variables can be identified by name or by an alphanumeric code (e.g., Chilled_Water_Temp, 7694, etc.). The point value can include an alphanumeric value indicating the current value of the data point (e.g., 44° F., fault code 4, etc.).

Network control engine 608 can broadcast the monitored variables and the equipment status information to a remote operations center (ROC) 602. ROC 602 can provide remote monitoring services and can send an alert to building 10 in the event of a critical alarm. ROC 602 can push the monitored variables and equipment status information to a reporting database 604, where the data is stored for reporting and analysis. Time varying performance indication 502 can access database 604 to retrieve the monitored variables and the equipment status information.

In some embodiments, time varying performance indication 502 is a component of BMS controller 366 (e.g., within FDD layer 416). For example, time varying performance indication system 502 can be implemented as part of a METASYS® brand building automation system, as sold by Johnson Controls Inc. In other embodiments, time varying performance indication system 502 can be a component of a remote computing system or cloud-based computing system configured to receive and process data from one or more building management systems. For example, time varying performance indication system 502 can connect the connected equipment 610 (e.g., chillers 612) to the cloud and collect real-time data for over a number of points (e.g., 50 points) on those equipment. In other embodiments, time varying performance indication system 502 can be a component of a subsystem level controller (e.g., a HVAC controller, etc.), a subplant controller, a device controller (e.g., AHU controller 330, a chiller controller, etc.), a field controller, a computer workstation, a client device, and/or any other system and/or device that receives and processes monitored variables from connected equipment 610.

Time varying performance indication system 502 may use the monitored variables to identify a current operating state of connected equipment 610. The current operating state can be examined by time varying performance indication system 502 to expose when connected equipment 610 begins to degrade in performance and/or to predict when faults will occur. In some embodiments, time varying performance indication system 502 determines whether the current operating state is a normal operating state or a faulty operating state. Time varying performance indication system 502 may report the current operating state and/or the predicted faults to client devices 448, service technicians 606, building 10, and/or any other system and/or device. Communications between time varying performance indication 502 and other systems and/or devices can be direct and/or via an intermediate communications network, such as network 446. If the current operating state is identified as a faulty state or moving toward a faulty state, time varying performance indication system 502 may generate an alert or notification for service technicians 606 to repair the fault or potential fault before it becomes more severe. In some embodiments, time varying performance indication system 502 uses the current operating state to determine an appropriate control action for connected equipment 610.

In some embodiments, time varying performance indication system 502 provides a web interface which can be accessed by service technicians 606, client devices 448, and other systems or devices. The web interface can be used to access the raw data in reporting database 604, view the results produced by the time varying performance indication system, identify which equipment is in need of preventative maintenance, and otherwise interact with time varying performance indication system 502. Service technicians 606 can access the web interface to view a list of equipment for which faults are predicted by time varying performance indication system 502. Service technicians 606 can use the predicted faults to proactively repair connected equipment 610 before a fault and/or an unexpected shut down occurs. These and other features of time varying performance indication system 502 are described in greater detail below.

Referring now to FIG. 7, a schematic diagram of a chiller 700 is shown, according to some embodiments. Chiller 700 is an example of a type of connected equipment 610 which can report monitored variables and status information (status codes) to time varying performance indication system 502. Chiller 700 is shown to include a refrigeration circuit having a condenser 702, an expansion valve 704, an evaporator 706, a compressor 708, and a control panel 710. In some embodiments, chiller 700 includes sensors that measure a set of monitored variables at various locations along the refrigeration circuit. Table 1 describes an exemplary set of monitored parameters/variables that can be measured in chiller 700. Time varying performance indication system 502 can use these or other variables to detect the current operating state of chiller 700, detect faults, predict potential/future faults, and/or determine diagnoses. Time varying performance indication system 502 may additionally use external parameters such as weather conditions and geographical location where the chiller 700 is operating.

TABLE 1

Monitored Chiller Parameters

| Number | ID | Description |
|---|---|---|
| 1 | MOT-FLA | Motor full load amps |
| 2 | CHWR-T | Chilled water return temperature |
| 3 | CHWS-T | Chilled water supply temperature |
| 4 | COND-P | Condenser pressure |
| 5 | EVAP-P | Evaporator pressure |
| 6 | CWR-T | Condensed water return temperature |
| 7 | CWS-T | Condensed water supply temperature |
| 8 | MTAMP-SP | Motor amps setpoint |
| 9 | CHWT-SP | Chilled water supply temperature setpoint |
| 10 | VFD OP-Hz | Variable frequency drive output frequency |
| 11 | CHWF-STS | Chilled water flow status |

Chiller 700 can be configured to operate in multiple different operating states. For example, chiller 700 can be operated in a low load state, a medium load state, a high load state, and/or various states therebetween. The operating states may represent the normal operating states or conditions of chiller 700. Faults in chiller 700 may cause the operation of chiller 700 to deviate from the normal operating states. For example, various types of faults may occur in each of the normal operating states. For example, faults can be caused by stalling or surging in the compressor or other mechanical effects that can occur during operation. In some embodiments, time varying performance indication system 502 can collect or receive samples of the monitored variables. For example, system 502 may collect or receive 1000 samples of the monitored variables at a rate of one sample per second.

Figure 8:
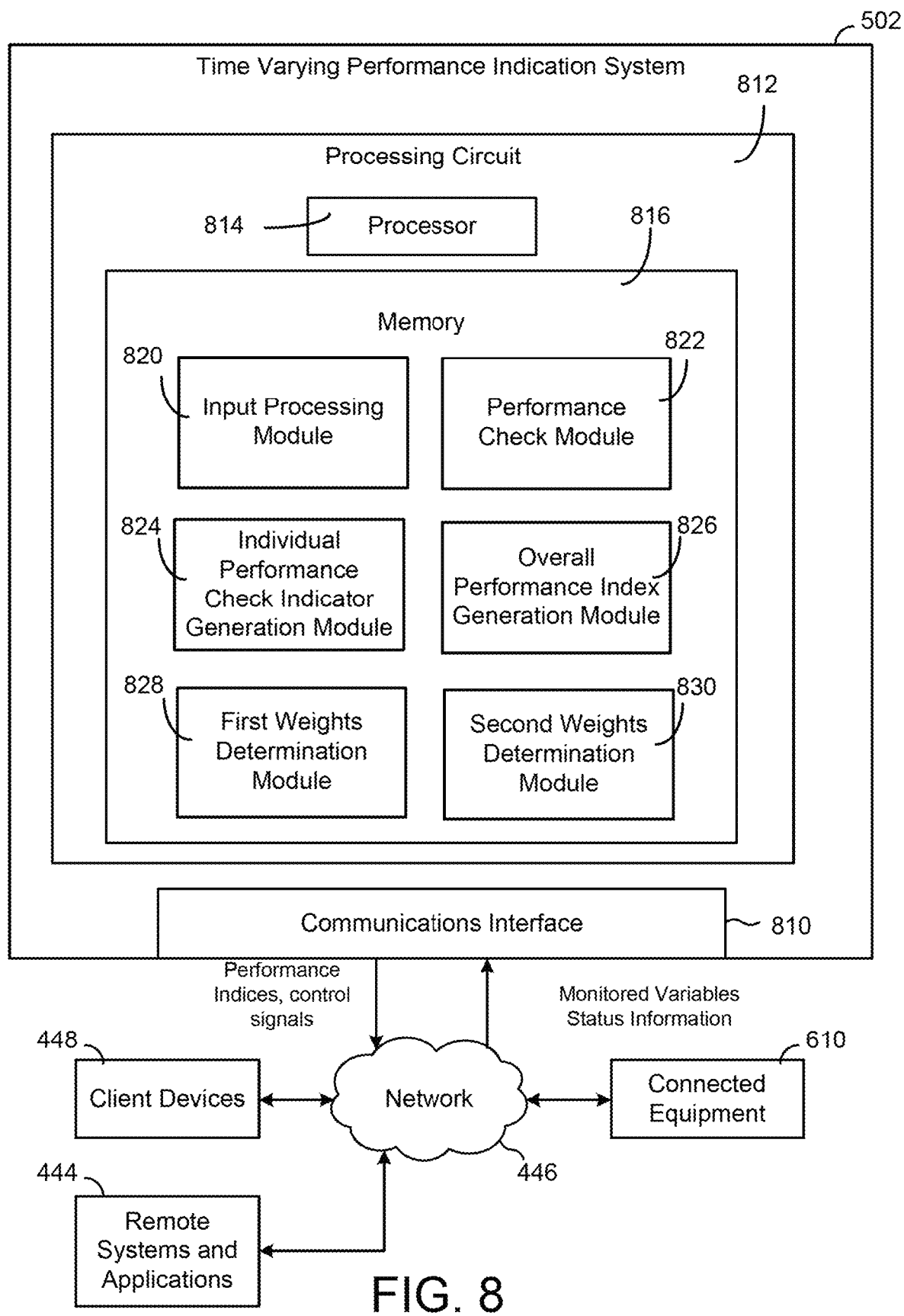
FIG. 8 is a block diagram of a time varying performance indication system of generating a performance index for connected equipment, according to some embodiments.

Referring now to FIG. 8, a block diagram illustrating the time varying performance indication system 502 in greater detail is shown, according to some embodiments. Time varying performance indication system 502 is shown to include a communications interface 810 and a processing circuit 812. Communications interface 810 may facilitate communications between time varying performance indication system 502 and various external systems or devices. For example, time varying performance indication system 502 may receive the monitored variables from connected equipment 610 and provide control signals, performance indices, and/or other information of detected faults to connected equipment 610 via communications interface 710. Communications interface 710 may also be used to communicate with remote systems and applications 444, client devices 448, and/or any other external system or device. For example, time varying performance indication system 502 may provide performance indices and other information of detected faults to remote systems and applications 444, client devices 448, service technicians 606, or any other external system or device via communications interface 810.

Communications interface 810 can include any number and/or type of wired or wireless communications interfaces (e.g., jacks, antennas, transmitters, receivers, transceivers, wire terminals, etc.). For example, communications interface 810 can include an Ethernet card and port for sending and receiving data via an Ethernet-based communications link or network. As another example, communications interface 810 can include a WiFi transceiver, a NFC transceiver, a cellular transceiver, a mobile phone transceiver, or the like for communicating via a wireless communications network. In some embodiments, communications interface 810 includes RS232 and/or RS485 circuitry for communicating with BMS devices (e.g., chillers, controllers, etc.). Communications interface 810 can be configured to use any of a variety of communications protocols (e.g., BACNet, Modbus, N2, MSTP, Zigbee, etc.). Communications via interface 810 can be direct (e.g., local wired or wireless communications) or via an intermediate communications network 446 (e.g., a WAN, the Internet, a cellular network, etc.). Communications interface 810 can be communicably connected with processing circuit 812, and the various components thereof can send and receive data via communications interface 810.

Processing circuit 812 is shown to include a processor 814 and memory 816. Processor 814 can be implemented as a general purpose processor, an application specific integrated circuit (ASIC), one or more field programmable gate arrays (FPGAs), a group of processing components, or other suitable electronic processing components. Memory 816 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 816 can be or include volatile memory or non-volatile memory. Memory 816 can include database components, object code components, script components, or any other type of information structure for supporting the various activities and information structures described in the present application.

According to some embodiments, memory 816 is communicably connected to processor 814 via processing circuit 812 and includes computer code for executing (e.g., by processing circuit 812 and/or processor 814) one or more processes described herein.

Still referring to FIG. 8, in some embodiments, the memory 816 can include at least an input processing module 820, a performance check module 822, an individual performance check indicator generation module 824, an overall performance index generation module 826, a first weights determination module 828, and a second weights determination module 830. In other embodiments, more, less, or different modules or components can be stored in memory 816. In some embodiments, the modules 820-830 can be implemented in one apparatus. In other embodiments, each of the modules 820-830 can be implemented in different and separate apparatuses and/or executed by different and separate processors, or a combination thereof. In some embodiments, modules 820-830 stored in a non-transitory computer readable medium (e.g., memory 816) can be executed by the processor 814 to perform operations as described herein. In some embodiments, each of the modules 820-830 or a combination of some of the modules 820-830 can be implemented as hardware circuits.

Figure 9:
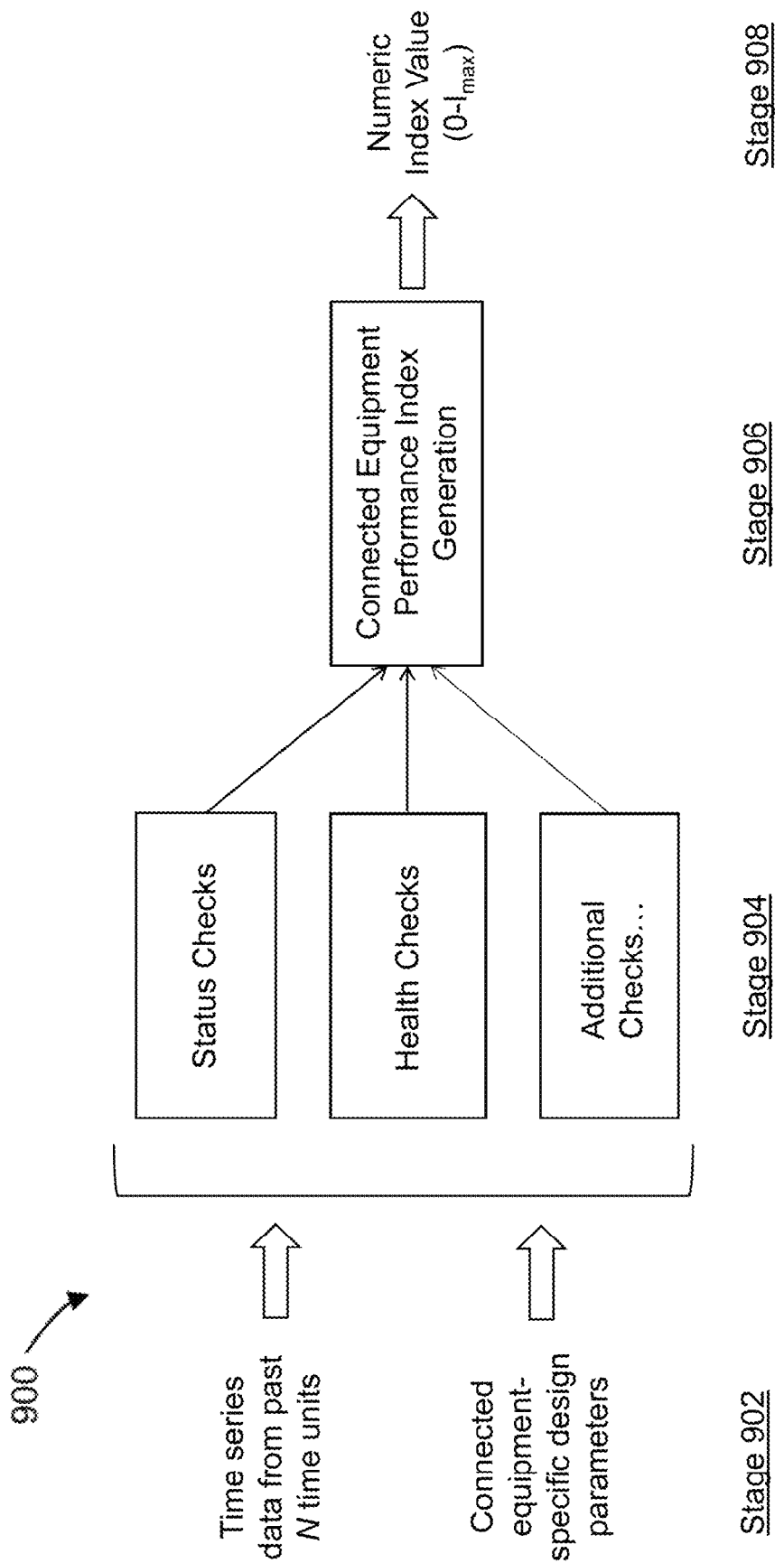
FIG. 9 is a high level flow diagram illustrating a process of generating a performance index for connected equipment, according to some embodiments.

Referring now to FIG. 9, a high level flow diagram illustrating a process 900 of generating a performance index for connected equipment is shown, according to some embodiments. In some embodiments, at stage 902, the time varying performance indication system 502 can be configured to obtain time series data from past N time units and connected equipment specific design parameters. For example, the input processing module 820 can be configured to obtain time series data and connected equipment specific design parameters. The time units can be days, hours, minutes, seconds, weeks, months, or years. N is a number, such as an integer. For example, the past N time units can be the past 5 days, past 2 weeks, etc. In some embodiments, the time series data can include data points of a plurality of monitored variables and a plurality of status codes from the connected equipment 610.

In some embodiments, the connected equipment 610 can be configured to measure a plurality of monitored variables and generate a plurality of status codes. As discussed herein above in relation to FIGS. 6 and 7, connected equipment 610 (e.g., chillers 612, 700) can measure monitored variables (e.g., measured or calculated temperatures, pressures, flow rates, valve positions, resource consumptions, control setpoints, model parameters) that can be any time-series values providing information about how the corresponding system, device, and/or process is performing. Connected equipment 610 can also provide or generate equipment status information in the form of status codes. In some embodiments, four types of status codes can be provided and reported by connected equipment (e.g., chiller), including safety shutdown codes (safety codes), warning codes, cycling codes, and operation codes. In the descriptions herein below, a chiller (e.g., chiller 612, 700) is used as an example of the connected equipment 610. It should be understood that connected equipment is not limited to chillers and the operations described herein below can be performed for any connected equipment.

In some embodiments, safety shutdown codes are generated when safety shutdowns occur. Safety shutdowns can be triggered when certain conditions that are deemed dangerous to a chiller occur. These conditions may cause physical damage to the evaporator, condenser, compressor, variable speed drive (VSD), motor, or other components of the chiller. By the time a safety shutdown occurs, the chiller may have already sustained some damage. In some embodiments, depending on what causes the safety shutdown, it may require time and money to do a shutdown and machine servicing, or it could just require a reset of a chiller panel or building control strategy. In some embodiments, knowing the type of safety shutdown may not be sufficient to determine the root cause and solution. In some embodiments, warning codes do not shut down the chiller but give alerts that the chiller is not operating under a good condition. In some embodiments, cycling codes generally shut down a chiller due to specific conditions that occur in the chiller. For example, if a pump that feeds the condenser fails, the chiller may shut down due to loss of condenser flow. In some embodiments, operation codes indicate if the chiller is running, not running, or in alarm or shutdown states. In some embodiments, there are a number of different safety codes, warning codes, and cycling codes that can occur. In some embodiments, the operation codes are limited to a maximum number (e.g., 15) and a subset (e.g., 3) represents states when the chiller is running.

In some embodiments, the input processing module 820 of the time varying performance indication system 502 can receive or obtain time series data (e.g., data points of the plurality of monitored variables and the plurality of status codes) from the connect equipment 610 through the communication interface 810 via the network 446. In some embodiments, the communication interface 810 can obtain the time series data from the reporting database 604. Table 2 shows an example of the time series data that can be used as inputs to the operations performed by the time varying performance indication system 502. In some embodiments, the data is collected from sensors and is related to physical quantities in the chiller. For example, for legacy chillers, points may be sampled every 1, 5, or 15 minutes, in some embodiments. For other chillers (e.g., SCC chillers), points may be change-of-value, in some embodiments.

TABLE 2

Sample Input Data

| timestamp | varname | | | | |
|---|---|---|---|---|---|
| | ACC OP HRS | ACC SYS STRT | CHWF-STS | CHWP-STS | CHWR-T |
| 2018-07-09 00:45:00 | 11377.0 | 885.0 | 0.0 | 0.0 | 13.7 |
| 2018-07-09 01:00:00 | 11377.0 | 885.0 | 0.0 | 0.0 | 13.8 |
| 2018-07-09 01:15:00 | 11377.0 | 885.0 | 0.0 | 0.0 | 13.8 |
| 2018-07-09 01:30:00 | 11377.0 | 885.0 | 0.0 | 0.0 | 13.7 |
| 2018-07-09 01:45:00 | 11377.0 | 885.0 | 0.0 | 0.0 | 13.7 |

| timestamp | varname | | | | |
|---|---|---|---|---|---|
| | CHWS-T | CHWT-SP | COND-AP | COND-P | CSAT-T |
| 2018-07-09 00:45:00 | 12.9 | 6.7 | −10.499999 | 368.9 | 13.8 |
| 2018-07-09 01:00:00 | 12.9 | 6.7 | −10.499999 | 369.6 | 13.8 |
| 2018-07-09 01:15:00 | 13.0 | 7.3 | −10.40001 | 369.6 | 13.8 |
| 2018-07-09 01:30:00 | 12.8 | 7.4 | −10.40001 | 370.3 | 13.8 |
| 2018-07-09 01:45:00 | 12.8 | 7.4 | −10.30001 | 370.3 | 13.9 |

| timestamp | varname | | | | |
|---|---|---|---|---|---|
| | VSD OP-Hz | VSD OP-V | VSD PH A-C | VSD PH B-C | VSD PH C-C |
| 2018-07-09 00:45:00 | 0.0 | 0.0 | 0.0 | 0.0 | 0.0 |
| 2018- Jul. 9 01:00:00 | 0.0 | 0.0 | 0.0 | 0.0 | 0.0 |
| 2018-07-09 01:15:00 | 0.0 | 0.0 | 0.0 | 0.0 | 0.0 |
| 2018-07-09 01:30:00 | 0.0 | 0.0 | 0.0 | 0.0 | 0.0 |
| 2018-07-09 01:45:00 | 0.0 | 0.0 | 0.0 | 0.0 | 0.0 |

| timestamp | varname | | | | |
|---|---|---|---|---|---|
| | VSD-CONVHS-T | VSD-SURG-CONT | VSDDC-V | VSDIA-T | WAR-CODE |
| 2018-07-09 00:45:00 | 23.0 | 943.0 | 1.0 | 31.0 | 0.0 |
| 2018-07-09 01:00:00 | 23.0 | 943.0 | 1.0 | 31.0 | 0.0 |

TABLE 2-continued

| Sample Input Data | | | | | |
|---|---|---|---|---|---|
| 2018-07-09 01:15:00 | 23.0 | 943.0 | 1.0 | 31.0 | 0.0 |
| 2018-07-09 01:30:00 | 23.0 | 943.0 | 1.0 | 31.0 | 0.0 |
| 2018-07-09 01:45:00 | 23.0 | 943.0 | 1.0 | 31.0 | 0.0 |

As illustrated in Table 2 above, each input data or time series data can include a value and a timestamp indicating the time that the data is collected. For example, chilled water flow status (varname or ID: CHWP-STS) for this particular chiller has a value of 0.0 at the time 2018-07-09 00:45:00. It should be understood that the example input data as shown in Table 2 are for illustrative purposes only and should not be regarded as limiting in any way.

In some embodiments, the input processing module 820 of the time varying performance indication system 502 can obtain or receive connected equipment specific parameters. The connected equipment specific parameters are parameters specific to the connected equipment (e.g. chiller 612, 700). In some embodiments, the connected equipment specific parameters are obtained from the reporting database 604 via the communication interface 810. In some embodiments, the connected equipment specific parameters are obtained from another system or storage via the network 446 through the communication interface 810. In some embodiments, the connected equipment specific parameters are stored in a memory or local storage of the time varying performance indication system 502. Example connected equipment specific parameters are illustrated with reference to Table 3 below.

Referring again to FIG. 9, in some embodiments, at stage 904, the time varying performance indication system 502 can be configured to perform a plurality of performance checks for the connected equipment using the time series data (e.g., data points of the plurality of monitored variables and the plurality of status codes) and connected equipment specific parameters obtained or received at stage 902. For example, the performance check module 822 can perform the performance checks for the connected equipment. In some embodiments, the performance checks include status checks (first performance checks) and health checks (second performance checks). In other embodiments, additional performance checks (e.g., raw sensor value checks, monitoring of long-term trends, setpoint deviations, vibration data, flow measurements, or any other checks with relevance to connected equipment health) can be performed for the connected equipment in addition to the status checks and health checks.

In some embodiments, the time varying performance indication system 502 (e.g., the performance check module 822) can perform a plurality of status checks for the connected equipment using a plurality of status codes from the past N time units (e.g., past 5 days). In some embodiments, the performance check module 822 can identify safety shutdown codes (safety codes), warning codes, and cycling codes generated by the connected equipment. For example, the safety codes, warning codes, and cycling codes in the past 5 days can be identified by checking the timestamps associated with each code.

In some embodiments, the time varying performance indication system 502 (e.g., the performance check module 822) can perform a plurality of health checks for the connected equipment using data points of the plurality of monitored variables from the past N time units (e.g., past 12 hours, past 5 days, past 2 weeks), a plurality of connected equipment specific parameters, and a plurality of predetermined rules. For example, the data points of the plurality of monitored variables from the past N time units and the plurality of connected equipment specific parameters obtained in stage 902 can be applied to a plurality of predetermined rules that are described in more detail below.

In some embodiments, the performance check module 822 can check a set of predetermined rules to determine if there is a violation of any of the rules. Responsive to a violation of one or more rules, the performance check module 822 can generate alerts or alarms depending on the degree of the severity of the violation and/or the rule being violated. Different connected equipment may have different health checks. In general, the health checks available for a certain connected equipment depend on the type of the connected equipment and customer configurations. Continuing using the example of the chiller as the connected equipment, in some embodiments, the performance check module 822 may consider a subset of the health checks that are used for the particular type of the chiller because not all health checks apply to every chiller. Table 3 shows a list of health check parameters (connected equipment specific parameters) and constants (thresholds) for a particular type of chiller as an illustrative example.

TABLE 3

Health check parameter and constant list for a type of chillers.

| Parameter | Value | Alert | Alarm |
|---|---|---|---|
| % FLA-MIN | 10 | | |
| Condenser Approach | | 3.5 | 5 |
| VSD - High Internal Amb. Temp. | | 135 | 140 |
| Low Refrigerant Level | | 15 | 10 |
| Cond Ent. Water | | | 85 |
| Evaporator Approach | | 3.5 | 5 |
| High Oil Temp. | | 155 | 165 |
| Runtime Threshold - (HealthChart) | 24 | | |
| High Refrigerant Level | | | 90 |
| Low condenser water entering temp. | | 49 | 47 |
| Runtime Threshold % - Condenser Approach | | 0.3 | 0.3 |
| Runtime Threshold % - VSD - High Internal Amb. temp | | 0.3 | 0.3 |
| Runtime Threshold % - Low Refrigerant Level | | 0.5 | 0.5 |
| Runtime Threshold % - Cond Ent. Water | | | 0.05 |
| Runtime Threshold % - Evaporator Approach | | 0.3 | 0.3 |
| Runtime Threshold % - High Oil Temp. | | 0.05 | 0.05 |
| Runtime Threshold % - High Refrigerant Level | | | 0.05 |
| Runtime Threshold % - VSD Capacity Control Alarm | | | 0.95 |
| Runtime Threshold % - Low condenser water entering temp. | | | 0.05 |

In some embodiments, for example, using the parameters and constants (thresholds) in Table 3, the performance check module 822 applies the following predetermined rules to perform the health checks.

1. High evaporator approach temperature:
   (MOT-FLA>Const(% FLA-MIN)) AND (EVAP-AP>Const(Evaporator Approach))
2. High condenser approach temperature:
   (MOT-FLA>Const(% FLA-MIN)) AND (COND-AP>Const(Condenser Approach))
3. High entering condenser water temperature:
   (MOT-FLA>Const(% FLA-MIN)) AND (CWS-T>Const(Cond Ent. Water))
4. High condenser refrigerant level:
   (MOT-FLA>Const(% FLA-MIN)) AND (REF-POS>Const(High Refrigerant Level))
5. Low condenser refrigerant level:
   (MOT-FLA>Const(% FLA-MIN)) AND (REF-POS<Const(Low Refrigerant Level)) AND (CHWR-T-CHWS-T>1.5)
6. High oil temperature while running:
   (MOT-FLA>Const(% FLA-MIN)) AND (OILS-T>Const(High Oil Temp.))
7. Low entering condenser water temperature:
   (MOT-FLA>Const(% FLA-MIN)) AND (CWS-T<Const(Low condenser water entering temp.))

In the above example health check rules, evaluated data points are limited to those collected while the chiller was running. For example, these data points must have operation codes that correspond to "running" states (e.g., 8, 9, 12) and have the motor percent full load amps values above Const(% FLA-MIN). As shown in Table 3, the value of (% FLA-MIN)=10 in this example. In some embodiments, the number of these data points sets the "Run Time." In some embodiments, "Alert Time" and "Alarm Time" indicate the number of data points where the chiller is running and is in alert and alarm conditions, respectively. For example, if the "Alert Time"/"Run Time" value exceeds the threshold listed in Table 3, the chiller is in Alert, and this health check is triggered. As an example, with respect to the first example health check rule for high evaporator approach temperature, an alert is triggered when the motor percent full load amps value (MOT-FLA) is above 10 and the evaporator approach (EVAP-AP) value is greater than 3.5. Continuing with this example, an alarm is triggered when the motor percent full load amps value (MOT-FLA) is above 10 and the evaporator approach (EVAP-AP) value is greater than 5.

In some embodiments, the time varying performance indication system 502 can determine a plurality of individual performance check indicators based on the status checks and the health checks using a plurality of first weights. For example, the individual performance check indicator generation module 824 can be configured to determine individual performance check indicators based on the status checks and the health checks. In some embodiments, the first weights are time based weights each determined based on a different timing. Example individual performance check indicators generation or determination processes are described in more detail in relation to FIGS. 11 and 12.

Figure 11:
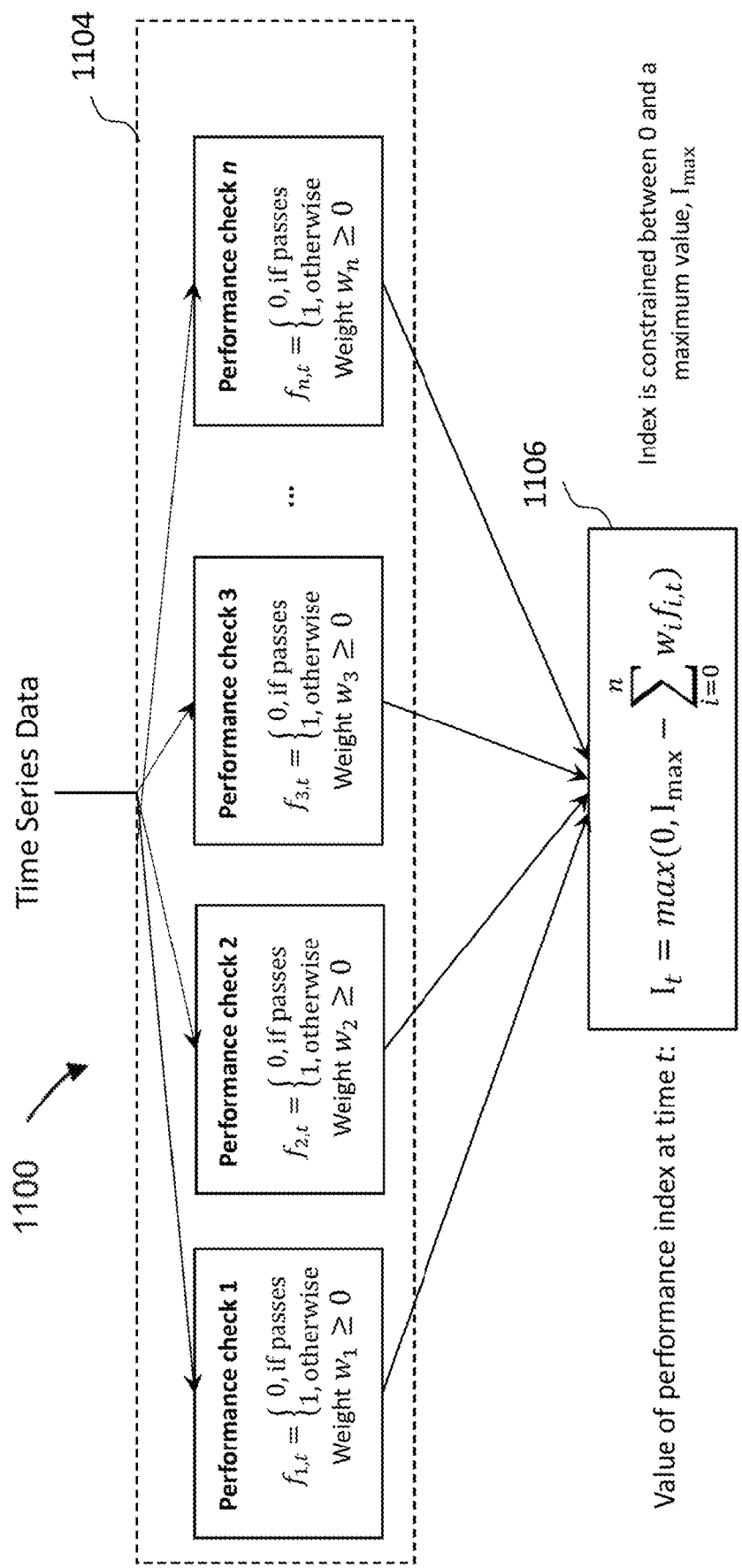
FIG. 11 is another flow diagram illustrating a process of generating a performance index for connected equipment, according to some embodiments.

Referring now to FIG. 11, a flow diagram illustrating a process 1100 of generating a performance index for connected equipment is shown, according to some embodiments. In brief overview, a window of time series data can be provided as input, and a number of performance checks can be applied to it. In some embodiments, each of the performance checks returns a 0 if it passes, or a 1 if it fails. The values are then multiplied by their respective weights to obtain a penalty factor for each check. Performance check weights reflect the severity or impact of the problems they detect, and may also be time dependent if, for example, the recent events are weighted more heavily than events that took place several days ago. The penalty factors are then summed and subtracted from the maximum value of the index, $I_{max}$ (e.g., 10, 100) to obtain the value of the performance index. In some embodiments, while the index decreases with each performance check violation, it is constrained to stay above 0.

Referring to FIG. 11, in further detail, at stage 1104, a plurality (n numbers) of performance checks (e.g., status checks, health checks) are performed as described with reference to stage 904 of FIG. 9. In some embodiments, an individual performance check indicator (e.g., $f_{1,t}, \ldots f_{n,t}$) may be generated as a result of the respective performance check. For example, $f_{n,t}=0$ if the respective performance check passes, and $f_{n,t}=1$ the respective performance check fails (e.g., an alert or alarm is triggered with respect to the health checks, a shutdown, warning, etc. are identified with respect to the status checks). In some embodiments, the individual performance check indicator is used with weights $w_1 \ldots w_n$ (second weights as described herein below) to generate the overall performance index. In the embodiments of the individual performance check indicator determination or generation process as shown in FIG. 11, the individual performance check indicator (e.g., $f_{1,t}, \ldots f_{n,t}$) has binary values (e.g., pass, fail). In other embodiments, the individual performance check indicator may have a series of values associated with time varying weights (first weights), as illustrated in relation to FIG. 12.

Figure 12:
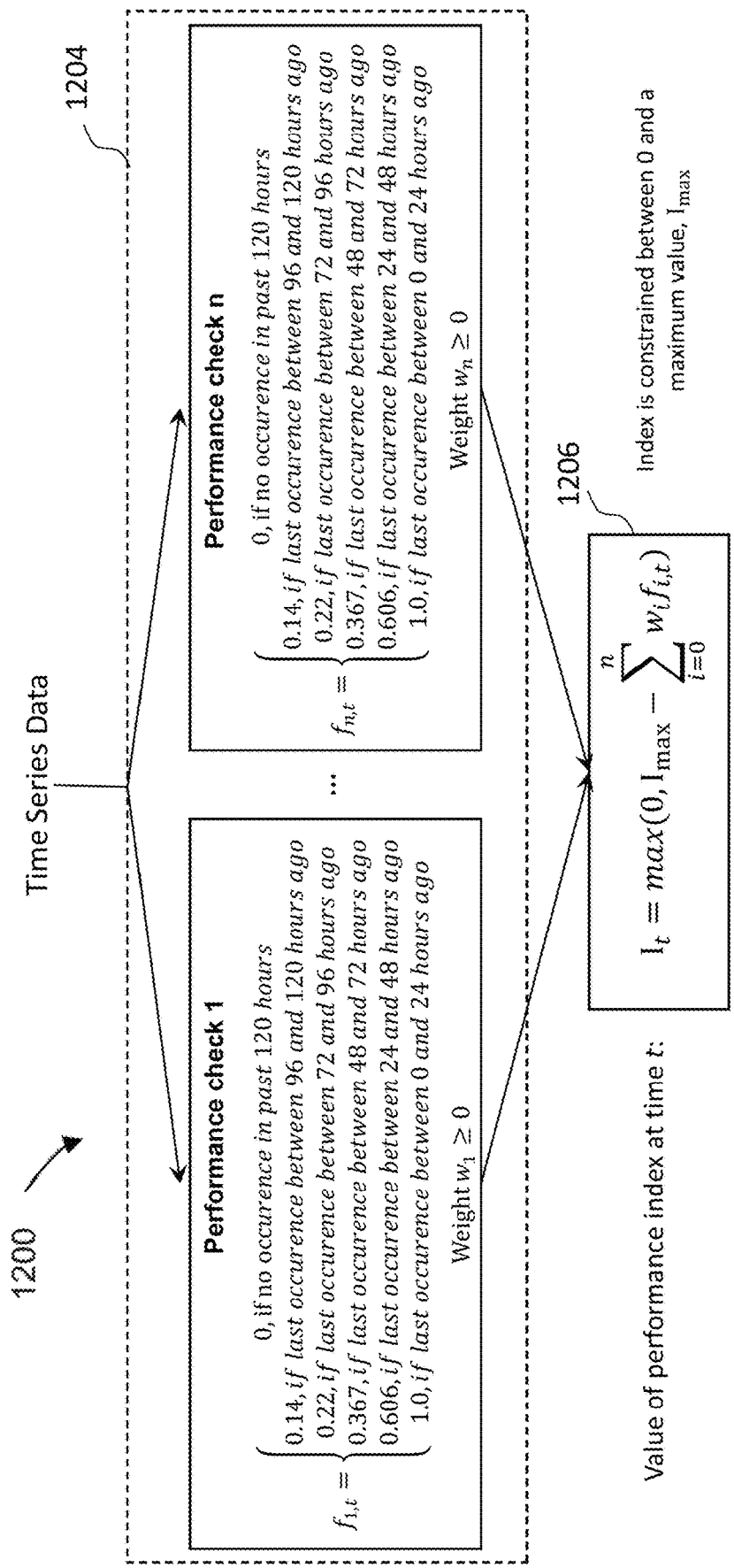
FIG. 12 is another flow diagram illustrating a process of generating a performance index for connected equipment, according to some embodiments.

Referring now to FIG. 12, a flow diagram illustrating a process 1200 of generating a performance index for connected equipment is shown, according to some embodiments. FIG. 12 is similar to the FIG. 11, with a different embodiment for the individual performance check indicator (e.g., $f_{1,t}, \ldots f_{n,t}$) generation or determination process. Referring to FIG. 12, at stage 1204, a plurality (n numbers) of performance checks (e.g., status checks, health checks) are performed as described with reference to stage 904 of FIG. 9. In the embodiments of FIG. 12, the individual performance check indicators (e.g., $f_{1,t}, \ldots f_{n,t}$) are time dependent when data from a period of time or range of days are considered. As shown in stage 1204 of FIG. 12, individual performance check indicators have different values based on when the events (e.g., an alert or alarm with respect to the health checks, a shutdown, warning, etc. are identified with respect to the status checks) occurred. For example, most recent events may be weighted heavier than earlier events during the past N time units (e.g., past 5 days). As shown in the examples of FIG. 12, the individual performance check indicator (e.g., $f_{1,t}, \ldots f_{n,t}$) decreases in value depending upon when the event is last happened. In the embodiments of FIG. 12, a set of time varying weights (first weights) 0, 0.14, 0.22, 0.367, 0.606, 1.0 are used for the individual performance check indicators. For example,
$f_{n,t}=0$ if no occurrence of the event in past 120 hours,
$f_{n,t}=0.14$ if last occurrence is between 96 and 120 hours,
$f_{n,t}=0.22$ if last occurrence is between 72 and 96 hours,
$f_{n,t}=0.367$ if last occurrence is between 48 and 72 hours,
$f_{n,t}=0.606$ if last occurrence is between 24 and 48 hours, and
$f_{n,t}=1$ if last occurrence is between 0 and 24 hours.

Figure 13:
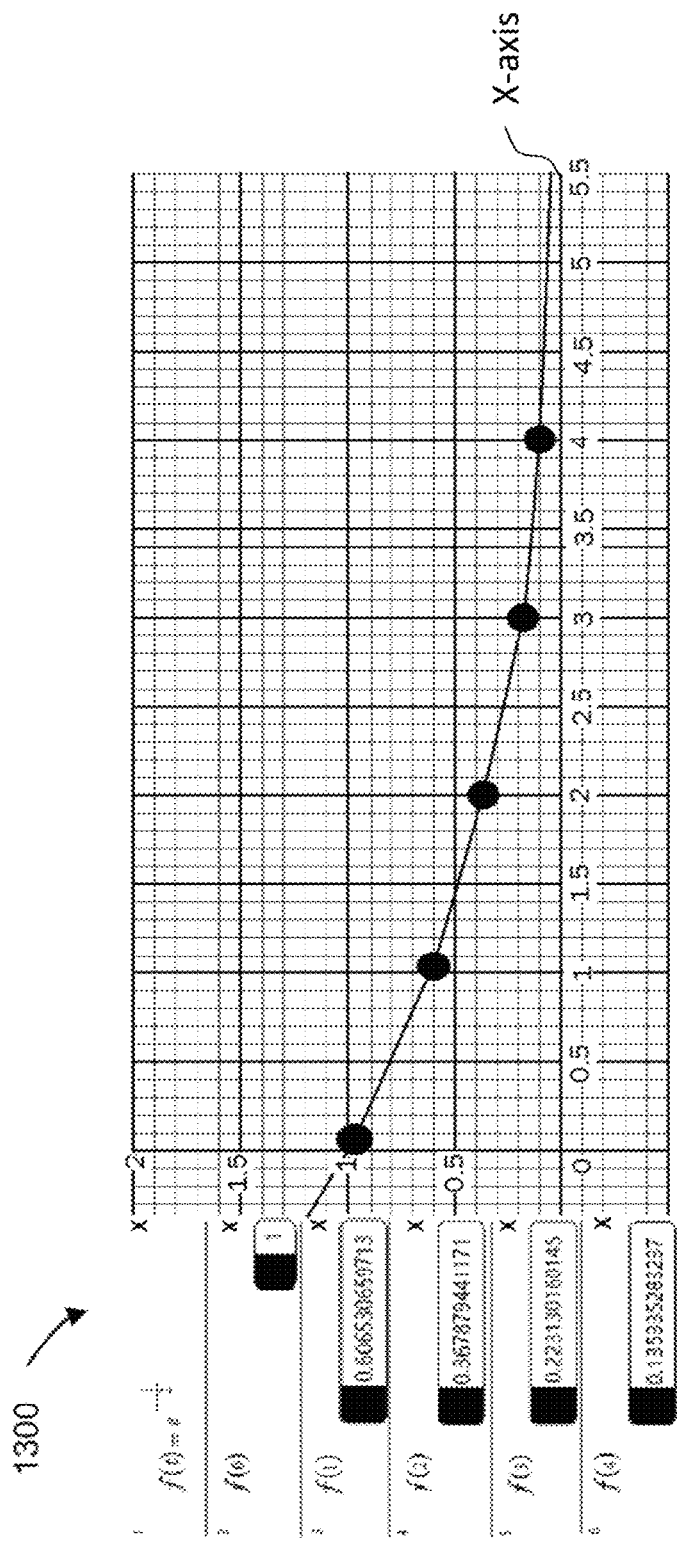
FIG. 13 is a graph illustrating the exponential decay function with a tau value of two, according to some embodiments.

In some embodiments, the first weights determination module 828 can determine the first weights used for the individual performance check indicators. For example, the first weights can be the time varying weights used for the individual performance check indicators described above in relation to FIG. 12. In some embodiments, the time varying weights are determined using the exponential decay function with a tau value of two. FIG. 13 shows a graph 1300 of the exponential decay function with a tau value of two, according to some embodiments. As shown in FIG. 13, the X-axis represents time and the dots show values used. In other embodiments, different methods can be used to determine the first weights or the time varying weights.

Figure 10:
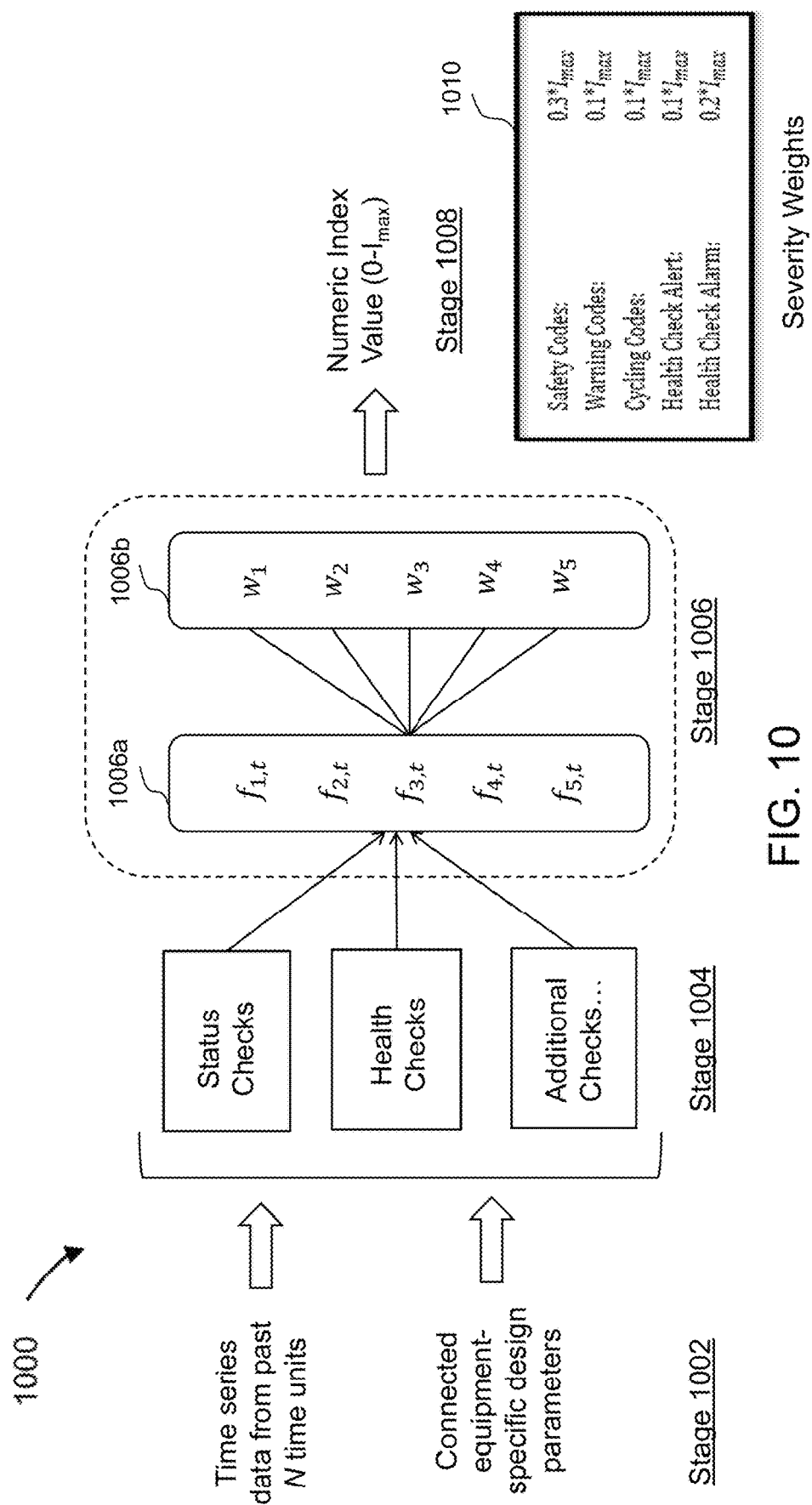
FIG. 10 is a flow diagram illustrating a process of generating a performance index for connected equipment, according to some embodiments.

Referring back to FIG. 9, in some embodiments, at stage 906, the time varying performance indication system 502 can be configured to generate an overall performance index for the connected equipment using the plurality of individual performance check indicators and a plurality of second weights. For example, the overall performance index generation module 826 can generate an overall performance index for the connected equipment. In some embodiments, an overall performance index in the form of a number index value (0-$I_{max}$) is produced at stage 908, where $I_{max}$ is a positive number (e.g., 10, 100), in some embodiments. FIGS. 10, 11 and 12 include a more detailed illustration of the overall performance index generation.

Referring now to FIG. 10, a flow diagram illustrating a process 1000 of generating a performance index for connected equipment is shown, according to some embodiments. Stages 1002, 1004 and 1008 can be identical or similar to stages 902, 904 and 908 as described with respect to FIG. 9 and will not be describe here again. Referring to FIG. 10, in some embodiments, at stage 1006, a plurality of individual performance check indicators 1006a and a plurality of second weights 1006b are used to produce overall performance index. For example, the individual performance check indicators described herein above in relation to FIGS. 11 and 12 can be used to generate the overall performance index. In some embodiments, the overall performance index is calculated as the summation of the products of all of the performance checks (individual performance check indicators) and their corresponding severity weights, and then subtracting this value from the $I_{max}$. In some embodiments, the $I_{max}$ is a positive number (e.g., 10, 100).

In some embodiments, the following equation (also as shown in stages 1106 and 1206 of FIGS. 11 and 12) can be used to generate the overall performance index for the connected equipment.

$$I_t = \max(0, I_{max} - \Sigma_{i=0}^{n} w_i f_{i,t}) \quad (1)$$

where $I_t$ is the value of the performance index at time t, $f_{i,t}$ represents the ith individual performance check indicator (performance check) of a total n number individual performance check indicators (performance checks) at time t, and $W_i$ represents the weight (second weight) for the corresponding (ith) individual performance check indicator $f_{i,t}$. It should be understood that the performance index formula as shown above is only one of several possible implementations and should not be regarded as limiting in any way.

In some embodiments, the second weights determination module 830 can determine the second weights. In some embodiments, the second weights can be determined based on severity or impact of the type of events associated with the performance check. In some embodiments, the plurality of second weights can be severity weights each representing a predetermined degree of severity of a respective first performance check or a respective second performance check. For example, a safety shut down event (represented by a safety code) is more severe than a warning event (represented by a warning code), and a health check alarm is more severe than a health check alert. In some embodiments, the second weights can be exponentially or linearly decaying weights based on exponential decay function or linear decay function. Example severity weighs are shown in table 1010 in FIG. 10. As shown in table 1010, each severity weight is a product of a weighting factor (e.g., 0.3, 0.1, 0.1, 0.1, 0.2) and $I_{max}$. For example, when $I_{max}$=10, the weight of the safety codes is 3, the weight of the warning code codes is 1, the weight of the cycling code is 1, the weight of the health check alert is 1, and the weight of the health check alarm is 2, in some embodiments. While the embodiment of table 1010 uses five severity weights that cover codes or checks for safety codes, cycling code, warning codes, health check alerts, and health check alarms, in other embodiments, each of these codes can be sort through and various weights can be assigned for individual codes and checks, increasing the number of severity weights overall.

The following is an example of calculating an overall performance index based on the embodiments of performance checks illustrated in FIG. 11 where time weighting (time varying weights) is not considered. This example illustrates how the overall performance index can be calculated for a daily run. For example, if for the first 5-day window, the status checks have 1 safety code, 2 warning codes, and 0 cycling codes detected, and the health checks have 1 health check alert and 0 alarms detected, then the overall performance index can be calculated as:

$$\begin{aligned}
\text{Performance Index for window } x &= \max(0, 10 - [(\# \text{ of safety codes} * 3) + \\
&\quad (\# \text{ of warning codes} * 1) + \\
&\quad (\# \text{ of cycling codes} * 1) + \\
&\quad (\# \text{ of health check alerts} * 1) + \\
&\quad (\# \text{ of health check alarms} * 2)]) \\
&= \max(0, 10 - (1*3) + (2*1) + (0*1) + (1*1) + (0*2) \\
&= \max(0, 10 - [3 + 2 + 0 + 1 + 0]) \\
&= \max(0, 10 - 6) \\
&= 4
\end{aligned}$$

In the above example, the maximum value $I_{max}$=10, and the overall performance index is constrained between 0 and $I_{max}$, that is, between 0 and 10 in this example. In some embodiments, the above calculation can be repeated for each window through the data.

Figure 14:
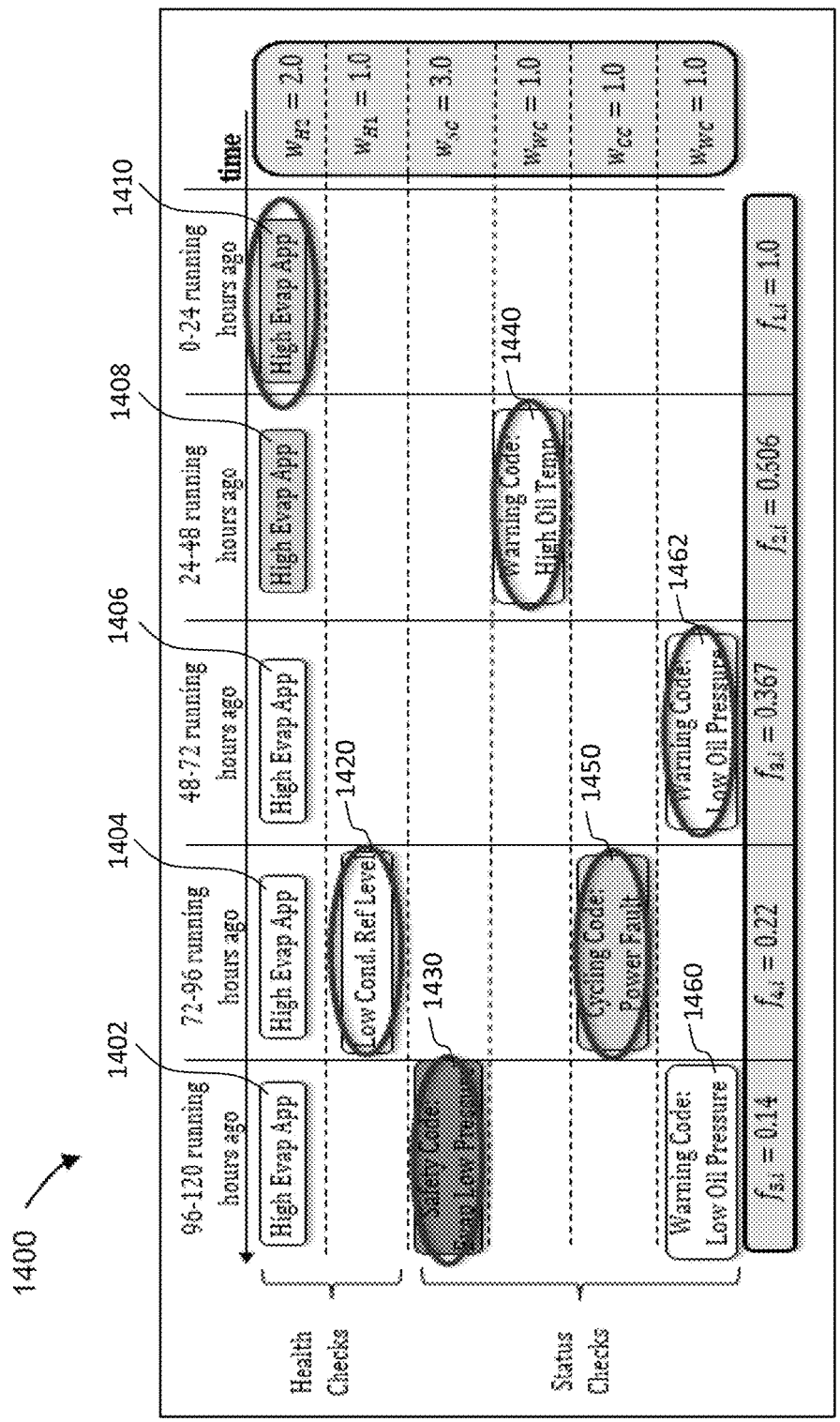
FIG. 14 is an example scenario of performance checks for generating an overall performance index, according to some embodiments.

The following is an example of calculating an overall performance index based on the embodiments of performance checks illustrated in FIG. 12 where time weighting (time varying weights) is considered. This example is described in relation to FIG. 14. Referring now to FIG. 14, an example scenario 1400 of performance checks for generating an overall performance index is shown, according to some embodiments. As shown in FIG. 14, performance checks are performed for the past 5 days. For example, health checks on "High Evap App" have detected 3 health check alerts (1402, 1404, 1406) and 2 health check alarms (1408, 1410) in the past 5 days. Health checks on "Low Cond. Ref Level" have detected 1 health check alert (1420) occurred 72-96 hours ago. Similarly, status checks have detected 1 safety code (1430) on "Evap Low Pressure" occurred 96-120 hours ago, 1 cycling code (1450) on "Power Fault" 72-96 hours ago, 1 waring code (1440) on "High Oil Temp" 24-48 hours ago, and 2 waring codes (1460, 1462) on "Low Oil Pressure" 96-120 hours ago and 48-72 hours ago.

In some embodiments, only the most recent instance of a performance check is considered in the calculation of the performance index. For example, as shown in FIG. 14, for the health checks on "High Evap App," only the most recent instance (1410) is considered in the calculation of the performance index. Similarly, since there are 2 waring codes (1460, 1462) on "Low Oil Pressure," only the most recent instance (1462) is considered. As shown in FIG. 14, performance checks (1410, 1420, 1430, 1440, 1450, and 1462) that are considered in the calculation of the performance index are circled.

Continuing with the example in FIG. 14, in some embodiments, using equation (1) as described above, the overall performance index can be calculated as:

$$\begin{aligned}\text{Performance Index} &= \max(0, 10 - [(\text{sum of safety codes} * W_{sc}) + \\ &\quad (\text{sum of warning codes} * W_{wc}) + \\ &\quad (\text{sum of cycling codes} * W_{cc}) + \\ &\quad (\text{sum of health check alerts} * W_{h1}) + \\ &\quad (\text{sum of health check alarms} * W_{h2}) \\ &= \max(0, 10 - [(0.14 * 3.0) + ((0.606 + 0.367) * 1.0) + \\ &\quad (0.22 * 1.0) + (0.22 * 1.0) + (1.0 * 2.0)]) \\ &= \max(0, 10 - [3.83]) \\ &= 6.17 \end{aligned}$$

As can be seen from the above example of FIG. 14, time weighting (time varying weights) is considered in the performance checks. For example, the two warning codes 1440 and 1462 have values of 0.606 and 0.367, respectively, taking the time varying weights as described in relation to FIG. 12 into consideration. In the above example, the maximum value $I_{max}=10$, and the overall performance index is constrained between 0 and $I_{max}$, that is, between 0 and 10 in this example. The $I_{max}$ can have other values. For example, if $I_{max}=100$, the overall performance index is constrained between 0 and 100.

The following is an implementation of the generation of the performance index in pseudocode, in some embodiments.
Read chiller time series data
Read chiller codes: safety codes, warning codes, cycling codes, and operating codes
Define inclusion interval=5 days
Define reporting frequency=1 days
Define weights={'SAF-CODE': 3.0, 'WAR-CODE': 1.0, 'CYC-CODE': 1.0, 'health_check_alert': 1.0, 'health_check_alarm': 2.0}
Define range of index={'min': 0, 'max': 10 }
Define parameters using as threshold values for health check rules:
  param_values={'percent_fla_min': 10.0,
  'cond_app_alert': 3.5, 'cond_app_alarm': 5, 'cond_app_runtime': 0.3,
  'low_ref_level_alert': 15, 'low_ref_level_alarm': 10, 'ref_level_runtime': 0.5,
  'cond_entering_water_alarm': 85, 'cond_entering_water_ runtime': 0.05,
  'evap_app_alert': 3.5, 'evap_app_alarm': 5, 'evap_app_runtime': 0.3,
  'high_oil_temp_alert': 155, 'high_oil_temp_alarm': 165, 'high_oil_temp_runtime': 0.05,
  'high_ref_level_alarm': 90,
  'low_cond_water_entering_temp_alert': 49, 'low_cond_water_entering_temp_alarm': 47,
  'evap_delta_temp': 1.5}
For each day in dataset, skipping by reporting frequency:
  Look at window of (current date—inclusion interval) to current date;
  Identify any safety codes, warning codes, and cycle codes occurring in this window;
  Run health checks for all points in window (remove points when chiller wasn't running);
  Aggregate any violations of health checks and codes to produce index.

In some embodiments, the time varying performance indication system 502 can be configured to determine that a total runtime of the connect equipment in a past time window, and generate the overall performance index only when the total runtime of the connect equipment in the past time window satisfies a predetermine threshold. For example, the performance index may be calculated only for connected equipment that is considered to be running for more than a predetermined total runtime or threshold (e.g., 2 hours) in a time window (e.g., last 24-hour period). In some embodiments, if a chiller (or other connected equipment) is not considered to be running, the performance index may not show up in a heat map or metrics, but may be listed in a grey section that contains all chillers that are either not running or that have been flagged or marked as disregard. In some embodiments, the motor full-load amps (MOT FLA) point is being used to calculate whether or not a chiller is running for a health check. In other embodiments, a method that utilizes operational codes and potentially input power (INPUT KW) may be used.

In some embodiments, health checks can consider a predetermined rolling window (e.g., 30-day rolling window) for their frequency index calculations (time in alert or alarm divided by total runtime hours). In some embodiments, for the performance index, a different predetermined rolling window (e.g., 24-hour rolling window) may be used, but it may follow the same logic as far as putting in Alert or Alarm stage if the frequency index value is above 20%. In some embodiments, an example health check frequency index can be calculated as:

$$\text{Health Check Frequency Index} = \frac{\text{Time in Alert or Alarm in Past 30 Days}}{\text{Total Runtime in Past 30 Days}}$$

In some embodiments, an example performance frequency index can be calculated as:

$$\text{Performance Frequency Index} = \frac{\text{Time in Alert or Alarm in Past 24 Hours}}{\text{Total Runtime in Past 24 Hours}}$$

It should be understood that the example health check frequency index and the example performance frequency index are provided for illustrative purposes only and should not be regarded as limiting in any way. In some embodiments, the health check frequency index and/or the performance frequency index can be updated periodically (e.g., every 4 hours).

In some embodiments, the generated performance index can be rated and/or color coded to indicate if the overall health of the connected equipment should be concerned and further investigation should be conducted. For example, the following example threshold table, Table 4, can be used when the $I_{max}=100$.

TABLE 4 threshold table for index values

| Index Value Range | Rating | Color |
| --- | --- | --- |
| 75.0-100.0 | Acceptable | Green |
| 50.0-75.0 | Alert | Yellow |
| 0.0-50.0 | Alarm | Red |

In some embodiments, the time varying performance indication system 502 can cause an adjustment to the connect equipment based on the overall performance index generated for the connected equipment. For example, in some embodiments, a report can be generated to indicate the overall health of the connected equipment. The report can be transmitted via the network 446 to another system or device to prompt further investigation of the connected equipment. One or more adjustments or actions may be performed based on the further investigation as a result of the value of overall performance index.

Figure 15:
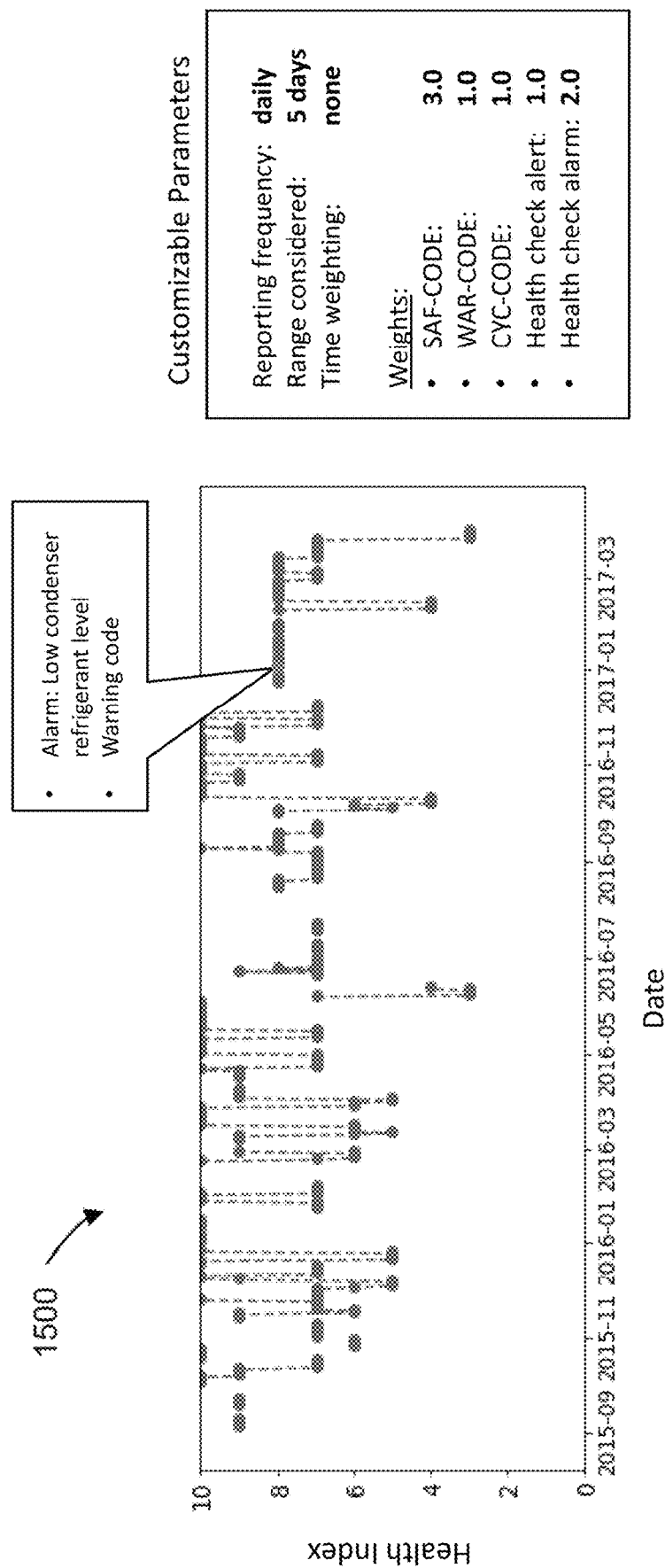
FIG. 15 is an example user interface illustrating an example of the calculated performance index over time, according to some embodiments.

Referring now to FIG. 15, an example user interface 1500 showing an example of the calculated performance index over time is shown, according to some embodiments. In some embodiments, the user interface 1500 can allow a user to hover over points and see any failed status checks and health checks that occurred during those times. In some embodiments, the user interface may also allow for the customization and tuning of parameters used in the algorithm, including how often the index is calculated, the date range to include, and weights for individual performance checks. In some embodiments, the user interface may provide an option to weigh the impact of failed performance checks by when they occurred. Such time weighting is beneficial because while users consider what has happened in the recent past, they may also want the index to be responsive to maintenance actions or other sudden changes in condition. In some embodiments, using exponentially or linearly decaying weights can enable the inclusion window adapt quickly to positive and negative changes in the index.

Figure 16:
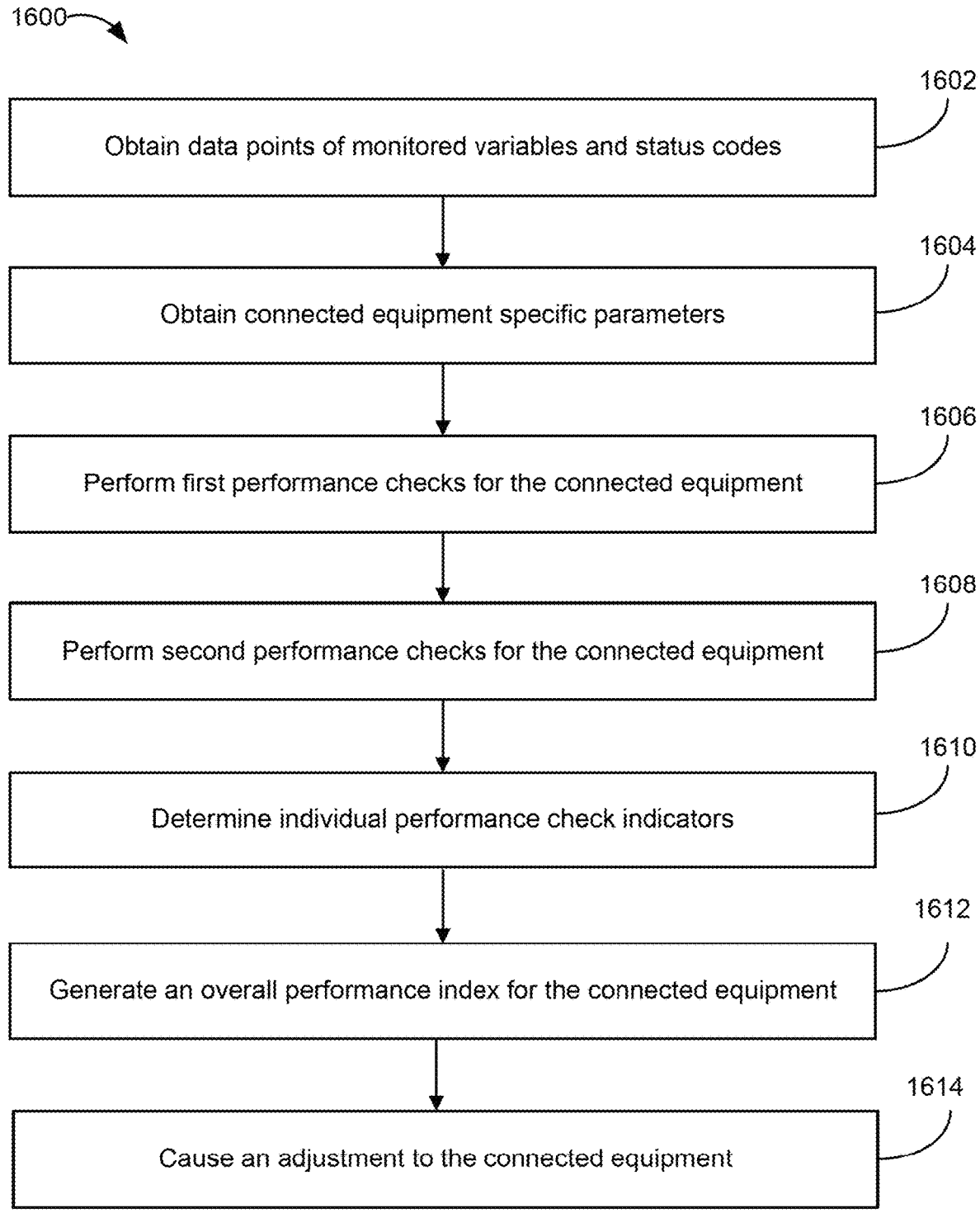
FIG. 16 is another flow diagram illustrating a process of generating a performance index for connected equipment, according to some embodiments.

Referring now to FIG. 16, a flow diagram illustrating a process 1600 of generating a performance index for connected equipment is shown, according to some embodiments. The process 1600 can be performed by the time varying performance indication system 502 to automatically generating a performance index for connected equipment. For example, the processor 814 of the processing circuit 812 can be configured to perform the process 1600. The process can include obtaining data points of a plurality of monitored variables and a plurality of status codes from past N time units (Stage 1602). N is a number, such as an integer. The plurality of monitored variables are measured by connected equipment, and the plurality of status codes are generated by the connected equipment. In some embodiments, the time units can be days, hours, minutes, seconds, weeks, months, or years. The process can include obtaining a plurality of connected equipment specific parameters that are parameters specific to the connected equipment (Stage 1604). The process can include performing a plurality of first performance checks for the connected equipment using the plurality of status codes from the past N time units (Stage 1606). The process can include performing a plurality of second performance checks for the connected equipment using the data points of the plurality of monitored variables from the past N time units, the plurality of connected equipment specific parameters, and a plurality of predetermined rules (Stage 1608). The process can include determining a plurality of individual performance check indicators based on the first performance checks and the second performance checks using a plurality of first weights each determined based on a different timing (Stage 1610). The process can include generating an overall performance index for the connected equipment using the plurality of individual performance check indicators and a plurality of second weights (Stage 1612). The process can include causing an adjustment to the connect equipment based on the overall performance index generated for the connected equipment (Stage 1614).

Systems and methods described herein can aggregate a plurality of performance checks and generate an overall performance index as a metric for the overall health of a chiller or other connected equipment that can be tracked over time. By combining the health checks, cycling, warning, and safety codes, an aggregate health index for a chiller or other connected equipment can be calculated. This index can indicate the overall health of the connected equipment at a given time and provide field technicians and diagnostic engineers the ability to pinpoint which connected equipment is most critical to attend to. Tracking this performance index over time can draw attention to connected equipment that are consistently in poor health or that are trending in a negative direction, prompting branch service technicians to investigate. Connected equipment performance indices could also be aggregated across different machines to obtain an overall picture of the health of a specific customer's connected equipment or of the connected equipment serviced by a specific branch or region, providing better diagnosis abilities and results.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system comprising:
    equipment operable to affect, monitor, or control one or more variable states or conditions in a building;
    a sensor configured to measure a variable relating to performance of the equipment; and
    a control system configured to:
        perform a plurality of performance checks for the equipment using a measurement from the sensor;
        determine a plurality of individual performance check indicators based on the plurality of performance checks using a plurality of first weights determined based on different timings;
        generate an overall performance index for the equipment using the plurality of individual performance check indicators and a plurality of second weights; and
        cause an adjustment to the equipment by initiating or executing a preventative maintenance action for the equipment based on the overall performance index.

2. The system of claim 1, wherein the plurality of performance checks are performed using at least one of data points of a monitored variable associated with the equipment, status codes generated by the equipment, or equipment-specific parameters.

3. The system of claim 2, wherein performing the plurality of performance checks comprises applying the data points and the equipment-specific parameters to one or more predetermined rules.

4. The system of claim 2, wherein the plurality of performance checks comprise first performance checks that use the status codes and second performance checks that use the data points and the equipment-specific parameters.

5. The system of claim 1, wherein the second weights are determined based on a degree of severity of a respective performance check of the plurality of performance checks.

6. The system of claim 1, wherein the computing system is further configured to:
    determine a total runtime of the equipment in a past time window; and
    generate the overall performance index in response to the total runtime of the equipment in the past time window satisfying a criterion.

7. The system of claim 1, wherein the equipment comprises one or more chillers, air handling units, actuators, controllers, boilers, economizers, valves, dampers, cooling towers, fans, pumps, lighting equipment, security equipment, refrigeration equipment, HVAC equipment, or sensors.

8. The system of claim 1, wherein initiating or executing the preventative maintenance action comprises at least one of scheduling the preventative maintenance action in a maintenance scheduling system, providing an alert message to a user or a user interface, proactively repairing or replacing the equipment before a fault occurs, or adjusting a control algorithm for the equipment to repair the fault or work-around the fault.

9. A method comprising:
    operating equipment to affect, monitor, or control one or more variable states or conditions in a building;
    measuring, by a sensor, a variable relating to performance of the equipment;
    performing a plurality of performance checks for the equipment using a measurement from the sensor;
    determining a plurality of individual performance check indicators based on the performance checks using a plurality of first weights determined based on different timings;
    determining an overall performance index for the equipment using the plurality of individual performance check indicators and a plurality of second weights; and
    causing an adjustment to the equipment by initiating or executing a preventative maintenance action for the equipment based on the overall performance index.

10. The method of claim 9, wherein the plurality of performance checks are performed using at least one of data points of a monitored variable associated with the equipment, status codes generated by the equipment, or equipment-specific parameters.

11. The method of claim 10, wherein performing the plurality of performance checks comprises applying the data points and the equipment-specific parameters to one or more predetermined rules.

12. The method of claim 10, wherein performing the plurality of performance checks comprises performing a first performance check using the status codes and performing a second performance check using the data points and the equipment-specific parameters.

13. The method of claim 9, wherein the plurality of second weights are determined based on a degree of severity of a respective performance check of the plurality of performance checks.

14. The method of claim 9, further comprising:
    determining a total runtime of the equipment in a past time window; and
    generating the overall performance index in response to the total runtime of the equipment in the past time window satisfying a criterion.

15. The method of claim 9, wherein the equipment comprises one or more chillers, air handling units, actuators, controllers, boilers, economizers, valves, dampers, cooling towers, fans, pumps, lighting equipment, security equipment, refrigeration equipment, HVAC equipment, or sensors.

16. The method of claim 9, wherein initiating or executing the preventative maintenance action comprises at least one of scheduling the preventative maintenance action in a maintenance scheduling system, providing an alert message to a user or a user interface, proactively repairing or replacing the equipment before a fault occurs, or adjusting a control algorithm for the equipment to repair the fault or work-around the fault.

17. One or more non-transitory computer-readable media having computer-executable instructions stored therein, the instructions when executed by at least one processor, causing the at least one processor to perform operations comprising:
- operating equipment to affect, monitor, or control one or more variable states or conditions in a building;
- receiving a measurement from a sensor configured measure a variable relating to performance of the equipment;
- performing a plurality of performance checks for the equipment using the measurement;
- determining a plurality of individual performance check indicators based on the plurality of performance checks using a plurality of first weights determined based on different timings;
- generating an overall performance index using the plurality of individual performance check indicators and a second weight; and
- cause an adjustment to the equipment by initiating or executing a preventative maintenance action for the equipment based on the overall performance index.

18. The non-transitory computer-readable media of claim 17, wherein performing the plurality of performance checks comprises applying data points associated with the equipment and an equipment-specific parameter to a predetermined rule.

19. The non-transitory computer-readable media of claim 17, wherein initiating or executing the preventative maintenance action comprises at least one of scheduling the preventative maintenance action in a maintenance scheduling system, providing an alert message to a user or a user interface, proactively repairing or replacing the equipment before a fault occurs, or adjusting a control algorithm for the equipment to repair or work-around the fault.

20. The non-transitory computer-readable media of claim 17, wherein the equipment comprise one or more chillers, air handling units, actuators, controllers, boilers, economizers, valves, dampers, cooling towers, fans, pumps, lighting equipment, security equipment, refrigeration equipment, HVAC equipment, or sensors.

* * * * *